(12) United States Patent
Zhang et al.

(10) Patent No.: US 11,871,023 B2
(45) Date of Patent: Jan. 9, 2024

(54) MULTI-MOTION MODEL BASED VIDEO CODING AND DECODING

(71) Applicants: Beijing Bytedance Network Technology Co., Ltd., Beijing (CN); Bytedance Inc., Los Angeles, CA (US)

(72) Inventors: Li Zhang, San Diego, CA (US); Kai Zhang, San Diego, CA (US); Hongbin Liu, Beijing (CN); Yue Wang, Beijing (CN)

(73) Assignees: BEIJING BYTEDANCE NETWORK TECHNOLOGY CO., LTD, Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/183,738

(22) Filed: Feb. 24, 2021

(65) Prior Publication Data

US 2021/0185341 A1   Jun. 17, 2021

Related U.S. Application Data

(63) Continuation of application No. PCT/IB2019/057141, filed on Aug. 26, 2019.

(30) Foreign Application Priority Data

Aug. 26, 2018   (WO) ................ PCT/CN2018/102370

(51) Int. Cl.
*H04N 19/513*   (2014.01)
*H04N 19/157*   (2014.01)
(Continued)

(52) U.S. Cl.
CPC ......... *H04N 19/513* (2014.11); *H04N 19/157* (2014.11); *H04N 19/176* (2014.11); *H04N 19/56* (2014.11)

(58) Field of Classification Search
CPC ...... H04N 19/176; H04N 19/52; H04N 19/70; H04N 19/105; H04N 19/61; H04N 19/513;
(Continued)

(56) References Cited

U.S. PATENT DOCUMENTS

| | | | |
|---|---|---|---|
| 2018/0070100 A1* | 3/2018 | Chen | ................. H04N 19/13 |
| 2018/0359483 A1 | 12/2018 | Chen et al. | |
| 2021/0185342 A1 | 6/2021 | Zhang et al. | |

FOREIGN PATENT DOCUMENTS

| | | |
|---|---|---|
| CN | 1882085 A | 12/2006 |
| CN | 104205838 A | 12/2014 |

(Continued)

OTHER PUBLICATIONS

Bross et al. "Versatile Video Coding (Draft 4)," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M1001, 2019.

(Continued)

*Primary Examiner* — Farhan Mahmud
(74) *Attorney, Agent, or Firm* — Perkins Coie LLP

(57) ABSTRACT

Methods, systems and devices for multi-motion model based video coding and decoding are described. An exemplary method for video processing includes determining, for a video block, a candidate for decoding using, for one or more target motion models from a number of motion models, one or more motion candidates from corresponding non-adjacent spatial or temporal blocks or motion information derived from previously coded blocks based on their associated motion models, and performing further processing of the video block using the candidate.

20 Claims, 22 Drawing Sheets

(51) Int. Cl.
*H04N 19/176* (2014.01)
*H04N 19/56* (2014.01)

(58) Field of Classification Search
CPC ...... H04N 19/159; H04N 19/46; H04N 19/13; H04N 19/139; H04N 19/51; H04N 19/91; H04N 19/82; H04N 19/136
See application file for complete search history.

(56) References Cited

FOREIGN PATENT DOCUMENTS

| | | |
|---|---|---|
| CN | 107113424 A | 8/2017 |
| CN | 107113440 A | 8/2017 |
| CN | 108293131 A | 7/2018 |
| WO | 2012059577 A | 5/2012 |
| WO | 2016091161 A1 | 6/2016 |
| WO | 2018052986 A1 | 3/2018 |

OTHER PUBLICATIONS

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.
JEM-7.0: https://jvet.hhi.fraunhofer.de/svn/svn_HMJEMSoftware/tags/ HM-16.6-JEM-7.0.
H.265/HEVC, https://www.itu.int/rec/T-REC-H.265.
Han et al. "CE4.2.3: Improvement on Merge/Skip Mode," Joint Video Exploration Team (JVET) of ITU-T SG 16 WP 3 and ISO/IEC JTC 1/SC 29/WG 11, 11th Meeting, Ljubljana, SI, Jul. 10-18, 2018, document JVET-K0339, 2018.
Li et al. "Multi-Type-Tree." Joint Video Exploration Team (JVET), of ITU-T SG 16 WP 3 and ISO/IEC JTC 1/SC 29/WG 11, 4th Meeting: Chengdu, CN, Oct. 15-21, 2016, document JVET-D0117rl, 2016.
Li et al. "History-based Motion Vector Prediction for Future Video Coding," 2019 IEEE International Conference on Mulitmedia and Expo (ICME), IEEE, Jul. 8, 2019, pp. 67-72.
Luthra et al. Overview of the H.264/AVC Video Coding Standard, Proceedings of SPIE, 5203, Applications of Digital Image Processing, Nov. 19, 2003, Optical Science and Technology, SPIE 48th annutal Meeting, San Diego, CA, US, 2003.
Ma et al. "AVS2—Making Video Coding Smarter," Standards in an Nutshell, IEEE Signal Processing Magazine, Mar. 2015, 32, p. 172-182.
Shao et al. "Multi-Directional Skip and Direct Modes Design in Bi-Predictive Slices for AVS2 Standard," 2013 IEEE International Conference on Multimedia and Expo (ICME), IEEE, Jul. 14, 2014, pp. 1-5.
Sullivan et al. "Overview of the High Efficiency Video Coding (HEVC) Standard," IEEE Transactions on Circuits and Systems for Video Technology, Dec. 2012, 22(12):1649-1668.
"Test Model of Essential Video Coding (ETM3.0)," 127 MPEG Meeting, Jul. 8-12, 2019, Gothenburg, Motion Picture Expert Group OR ISO/IEC JTC1/SC29/WG11, No. N18569, Aug. 9, 2019, retrieved from the Internet: URL:http://phenix.int-evry.fr/mpeg/doc_end_user/documents/127_Gothenburg/wg11/w18569.zip w18569_ETM3.0_description.docx, retrieved Sep. 26, 2019.
Yang et al. "Description of Core Experiment 4 (CE4): Inter Prediction and Motion Vector Coding," Joint Video Experts Team (JVET) of ITU-T SG 16 WP3 and ISO/IEC JTC 1/SC 29/WG 11, 11th Meeting, Ljubljana, SI, Jul. 10-18, 2018, document JVET-K1024, 2018.
Zhang et al. "CE4-Related: History-based Motion Vector Prediction," Joint Video Experts Team (JVET) of ITU-T SG 16 WP 3 and ISO/IEC JTC 1/SC 29/WG 11, 11th Meeting: Ljubljana, SI, Jul. 10-18, 2018, document JVET-K0104, 2018.
International Search Report and Written Opinion from International Patent Application No. PCT/IB2019/057141 dated Dec. 2, 2019 (20 pages).
International Search Report and Written Opinion from International Patent Application No. PCT/IB2019/057143 dated Dec. 2, 2019 (18 pages).
International Search Report and Written Opinion from International Patent Application No. PCT/IB2019/057144 dated Dec. 12, 2019 (18 pages).
Non-Final Office Action from U.S. Appl. No. 17/183,790 dated Jun. 27, 2022.

* cited by examiner

MULTI-MOTION MODEL BASED VIDEO CODING AND DECODING

CROSS-REFERENCE TO RELATED APPLICATIONS

This application is a continuation of International Application No. PCT/IB2019/057141, filed on Aug. 26, 2019, which claims the priority to and benefits of International Patent Applications No. PCT/CN2018/102370 filed on Aug. 26, 2018. All the aforementioned patent applications are hereby incorporated by reference in their entireties.

TECHNICAL FIELD

This document is related to video coding and decoding technologies.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The disclosed techniques may be used by video decoder or encoder embodiments in which multi-motion model based video coding and/or decoding is performed.

In one example aspect, a method for video processing is disclosed. The method includes determining, for a video block, a candidate for decoding using, for one or more target motion models from a number of motion models, one or more motion candidates from corresponding non-adjacent spatial or temporal blocks or motion information derived from previously coded blocks based on their associated motion models; and performing further processing of the video block using the candidate.

In another example aspect, a method for video processing is disclosed. The method includes determining, for a video block, a candidate for encoding using, for one or more target motion models from a number of motion models, one or more motion candidates from corresponding non-adjacent spatial or temporal blocks or motion information derived from previously coded blocks based on their associated motion models; and performing further processing of the video block using the candidate.

In yet another example aspect, a method for video processing is disclosed. The method includes determining, for a video block, a candidate for decoding using, for one or more motion models from a number of motion models, motion candidates related to other video blocks, wherein the motion candidates include two or more motion candidates from a same motion model of the one or more motion models; and performing further processing of the video block using the candidate.

In yet another example aspect, a method for video processing is disclosed. The method includes determining, for a video block, a candidate for encoding using, for one or more motion models from a number of motion models, motion candidates related to other video blocks, wherein the motion candidates include two or more motion candidates from a same motion model of the one or more motion models; and performing further processing of the video block using the candidate.

In yet another example aspect, a method for video processing is disclosed. The method includes performing, for a video block, a search for a candidate for decoding using, for one or more target motion models from a number of motion models, one or more motion candidates from corresponding non-adjacent spatial or temporal blocks or motion information derived from previously coded blocks based on their associated motion models; and performing further processing of the video block using the candidate, where a searching order for the search is based on at least one motion model of the one or more target motion models.

In yet another example aspect, a method for video processing is disclosed. The method includes performing, for a video block, a search for a candidate for encoding using, for one or more target motion models from a number of motion models, one or more motion candidates from corresponding non-adjacent spatial or temporal blocks or motion information derived from previously coded blocks based on their associated motion models; and performing further processing of the video block using the candidate, where a searching order for the search is based on at least one motion model of the one or more target motion models.

In some embodiments, the methods may preferably include the one or more motion candidates, including those from corresponding non-adjacent spatial or temporal blocks or the motion information derived from the previously coded blocks, being checked in order to identify at least one motion candidate with the same motion model as one of the one or more target motion models.

In some embodiments, the methods may preferably include the at least one motion candidate being identified and used as the candidate before motion candidates identified from an artificial searching process comprising spatially adjacent blocks.

In some embodiments, the methods may preferably include the at least one motion candidate being identified and used as the candidate before motion candidates from a default motion vector (MV) construction process.

In some embodiments, the methods may preferably include the one or more motion candidates being checked during an artificial searching process, subsequent to checking the one or more motion candidates from corresponding adjacent neighboring blocks.

In some embodiments, the methods may preferably include the number of motion models comprising a bi-direction mode, a symmetry mode, a backward mode and a forward mode.

In some embodiments, the methods may preferably include each of the one or more motion candidates belonging to a given motion model different from the one or more target motion models, and the number of motion models further comprising the given motion model.

In some embodiments, the methods may preferably include each of the one or more motion candidates belonging to a same motion model, and an indication of the same motion model being signaled and followed by an index indicating the motion candidates corresponding to one of the non-adjacent blocks.

In some embodiments, the methods may preferably include the motion information derived from the previously coded blocks comprising history-based motion vector prediction (HMVP) candidates.

In some embodiments, the methods may preferably include the motion candidates being signaled with a first syntax element indicating a given motion model in the number of motion models, and a second syntax element indicating a candidate index of the motion candidates associated with the given motion model.

In some embodiments, the methods may preferably include one of the motion candidates being selected as the candidate at a decoder-side, and a bitstream representation of the video block excluding signaling corresponding to the motion candidates.

In some embodiments, the methods may preferably include the candidate being signaled with a single index of the motion candidates.

In some embodiments, the methods may preferably include the motion candidates being determined based on spatially adjacent blocks associated with the same motion model.

In some embodiments, the methods may preferably include the motion candidates being determined based on spatially non-adjacent blocks associated with the same motion model.

In some embodiments, the methods may preferably include the motion candidates comprising history-based motion vector prediction (HMVP) candidates with the same motion model.

In some embodiments, the methods may preferably include the motion candidates being based on a motion model-matched search of different blocks or look-up tables (LUTs) associated with one or more history-based motion vector prediction (HMVP) candidates, an artificial search of different blocks or LUTs, or one or more default motion vectors.

In some embodiments, the methods may preferably include corresponding sizes of allowed multiple candidates from each of the one or more motion models being equal.

In some embodiments, the methods may preferably include corresponding sizes of allowed multiple candidates from the one or more motion models comprising different sizes.

In some embodiments, the methods may preferably include corresponding sizes of the motion candidates being predefined or signaled in a sequence parameter set (SPS), a picture parameter set (PPS) or a slice header.

In some embodiments, the methods may preferably include sizes of the motion candidates being based on a size of the video block, a shape of the video block, a coding mode of the video block, a picture type of a picture comprising the video block, a slice type of a slice comprising the video block or a low-delay check flag.

In some embodiments, the methods may preferably include the searching order being different for different motion models.

In some embodiments, the methods may preferably include the searching order being predefined.

In some embodiments, the methods may preferably include the searching order being configured to change for different video blocks.

In some embodiments, the methods may preferably include the searching order being based on a searching order result associated with a motion model different from the one or more motion models.

In some embodiments, the methods may preferably include the searching order being based on at least one of a size of the video block, a shape of the video block or a coding mode of the video block.

In some embodiments, the methods may preferably include each of the one or more motion models being associated with a corresponding historical motion vector (MV) list, and wherein the historical MV lists provides the motion candidates.

In some embodiments, the methods may preferably include a first subset of the one or more motion models being associated with a corresponding historical MV list, wherein a second subset of the one or more motion models is not associated with a corresponding historical MV list, the first subset comprising bi-prediction and symmetric models, and the second subset comprising forward-prediction and backward-prediction models.

In some embodiments, the methods may preferably include the historical MV list being updated upon a determination that an inter-coded video block comprising an MV associated with the one or more motion models is coded or decoded.

In some embodiments, the methods may preferably include a coding of a motion model index denoted by cu_subtype_index being extended to allow for inclusion of multiple candidates in addition to five motion models of the one or more motion models.

In some embodiments, the methods may preferably include the coding being based on a truncated unary binarization method.

In some embodiments, the methods may preferably include each bin in the coding of cu_subtype_index being coded with at least one context.

In some embodiments, the methods may preferably include a first set of bins in the coding of cu_subtype_index being coded with at least one context, and a second set of bins in the coding of cu_subtype_index being coded with a bypass mode.

In yet another example aspect, the above-described method may be implemented by a video decoder apparatus that comprises a processor.

In yet another example aspect, the above-described method may be implemented by a video encoder apparatus that comprises a processor.

In yet another example aspect, these methods may be embodied in the form of processor-executable instructions and stored on a computer-readable program medium.

These, and other, aspects are further described in the present document.

DETAILED DESCRIPTION

The present document provides various techniques that can be used by a decoder of video bitstreams to improve the quality of decompressed or decoded digital video. Furthermore, a video encoder may also implement these techniques during the process of encoding in order to reconstruct decoded frames used for further encoding.

Section headings are used in the present document for ease of understanding and do not limit the embodiments and techniques to the corresponding sections. As such, embodiments from one section can be combined with embodiments from other sections.

1. Summary

This patent document is related to video coding technologies. Specifically, it is related to motion vector coding in image/video coding. It may be applied to the existing video coding standard like HEVC, or the standard (Versatile Video Coding), third generation of the Chinese Audio and Video coding Standard (AVS3) to be finalized. It may be also applicable to future video coding standards or video codec.

2. Background

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized.

Partition Structure

Partition Tree Structure in H.264/AVC

The core of the coding layer in previous standards was the macroblock, containing a 16×16 block of luma samples and, in the usual case of 4:2:0 color sampling, two corresponding 8×8 blocks of chroma samples.

An intra-coded block uses spatial prediction to exploit spatial correlation among pixels. Two partitions are defined: 16×16 and 4×4.

An inter-coded block uses temporal prediction, instead of spatial prediction, by estimating motion among pictures. Motion can be estimated independently for either 16×16 macroblock or any of its sub-macroblock partitions: 16×8, 8×16, 8×8, 8×4, 4×8, 4×4 (see FIG. 2). Only one motion vector (MV) per sub-macroblock partition is allowed.

Figure 1:
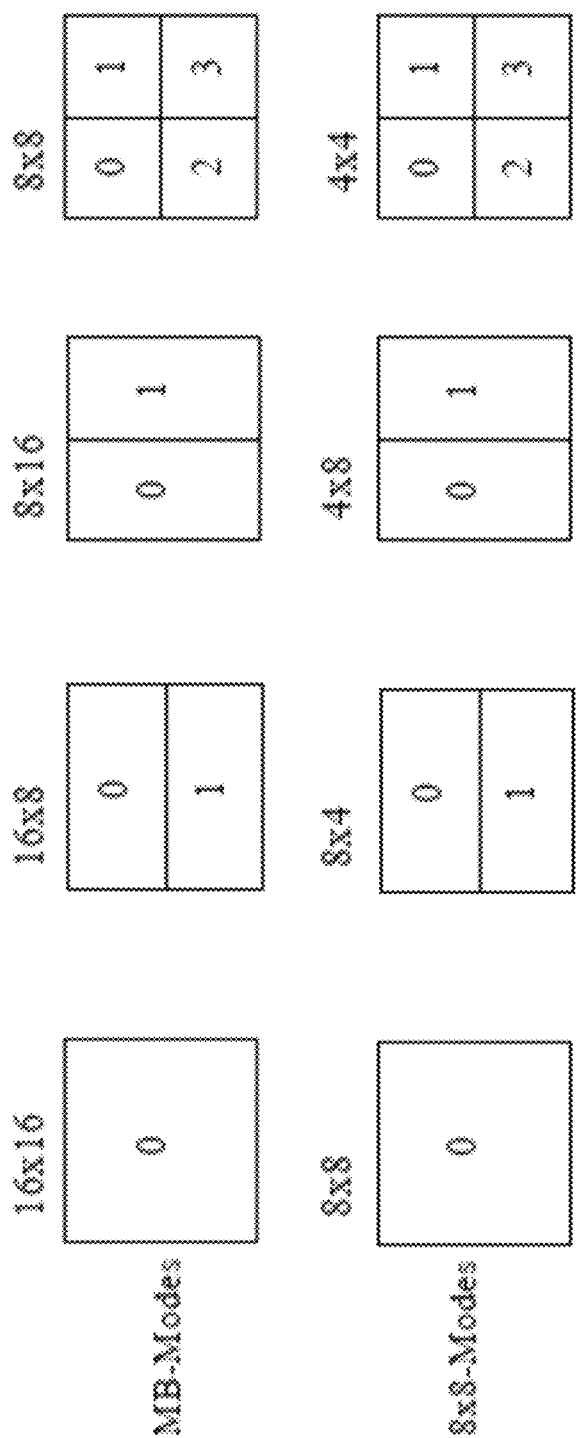
FIG. 1 is an illustration of MB partitions in H.264/Advanced Video Coding (AVC).

FIG. 1 is an illustration of MB partitions in H.264/Advanced Video Coding (AVC).

2.1.2 Partition Tree Structure in HEVC

In HEVC, a CTU is split into CUs by using a quadtree structure denoted as coding tree to adapt to various local characteristics. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU. One of key feature of the HEVC structure is that it has the multiple partition conceptions including CU, PU, and TU.

In the following, the various features involved in hybrid video coding using HEVC are highlighted as follows.

1) Coding tree units and coding tree block (CTB) structure: The analogous structure in HEVC is the coding tree unit (CTU), which has a size selected by the encoder and can be larger than a traditional macroblock. The CTU consists of a luma CTB and the corresponding chroma CTBs and syntax elements. The size L×L of a luma CTB can be chosen as L=16, 32, or 64 samples, with the larger sizes typically enabling better compression. HEVC then supports a partitioning of the CTBs into smaller blocks using a tree structure and quadtree-like signaling.

2) Coding units (CUs) and coding blocks (CBs): The quadtree syntax of the CTU specifies the size and positions of its luma and chroma CBs. The root of the quadtree is associated with the CTU. Hence, the size of the luma CTB is the largest supported size for a luma CB. The splitting of a CTU into luma and chroma CBs is signaled jointly. One luma CB and ordinarily two chroma CBs, together with associated syntax, form a coding unit (CU). A CTB may contain only one CU or may be split to form multiple CUs, and each CU has an associated partitioning into prediction units (PUs) and a tree of transform units (TUs).

Figure 2:
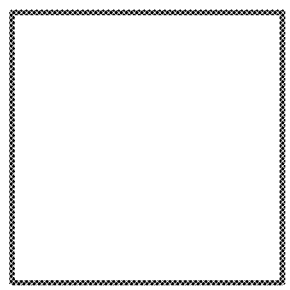
FIG. 2 shows examples of modes for splitting a coding block (CB) into prediction blocks (PBs).
Figure 2:
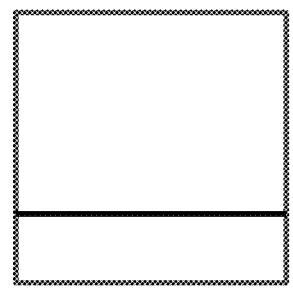
Figure 2:
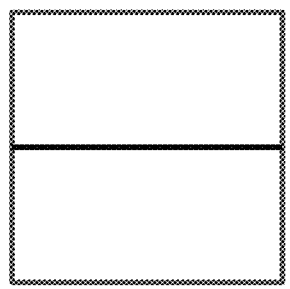
Figure 2:
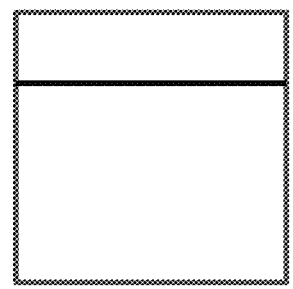
Figure 2:
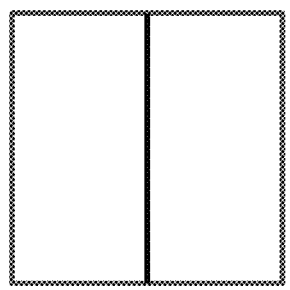
Figure 2:
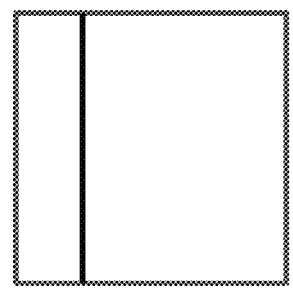
Figure 2:
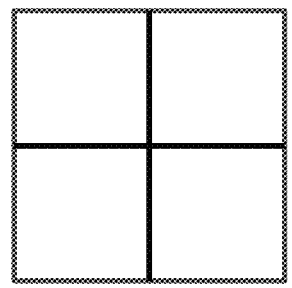
Figure 2:
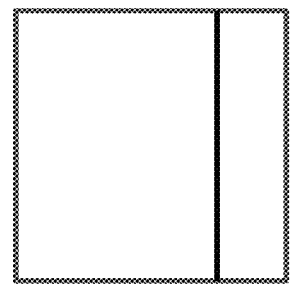

3) Prediction units and prediction blocks (PBs): The decision whether to code a picture area using inter picture or intra picture prediction is made at the CU level. A PU partitioning structure has its root at the CU level. Depending on the basic prediction-type decision, the luma and chroma CBs can then be further split in size and predicted from luma and chroma prediction blocks (PBs). HEVC supports variable PB sizes from 64×64 down to 4×4 samples. FIG. 2 shows examples of allowed PBs for a M×M CU.

FIG. 2 shows examples of modes for splitting a coding block (CB) into prediction blocks (PBs). Modes for splitting a CB into PBs, subject to certain size constraints. For intrapicture-predicted CBs, only M×M and M/2×M/2 are supported.

4) TUs and transform blocks: The prediction residual is coded using block transforms. A TU tree structure has its root at the CU level. The luma CB residual may be identical to the luma transform block (TB) or may be further split into smaller luma TBs. The same applies to the chroma TBs. Integer basis functions similar to those of a discrete cosine transform (DCT) are defined for the square TB sizes 4×4, 8×8, 16×16, and 32×32. For the 4×4 transform of luma intra picture prediction residuals, an integer transform derived from a form of discrete sine transform (DST) is alternatively specified.

Figure 3:
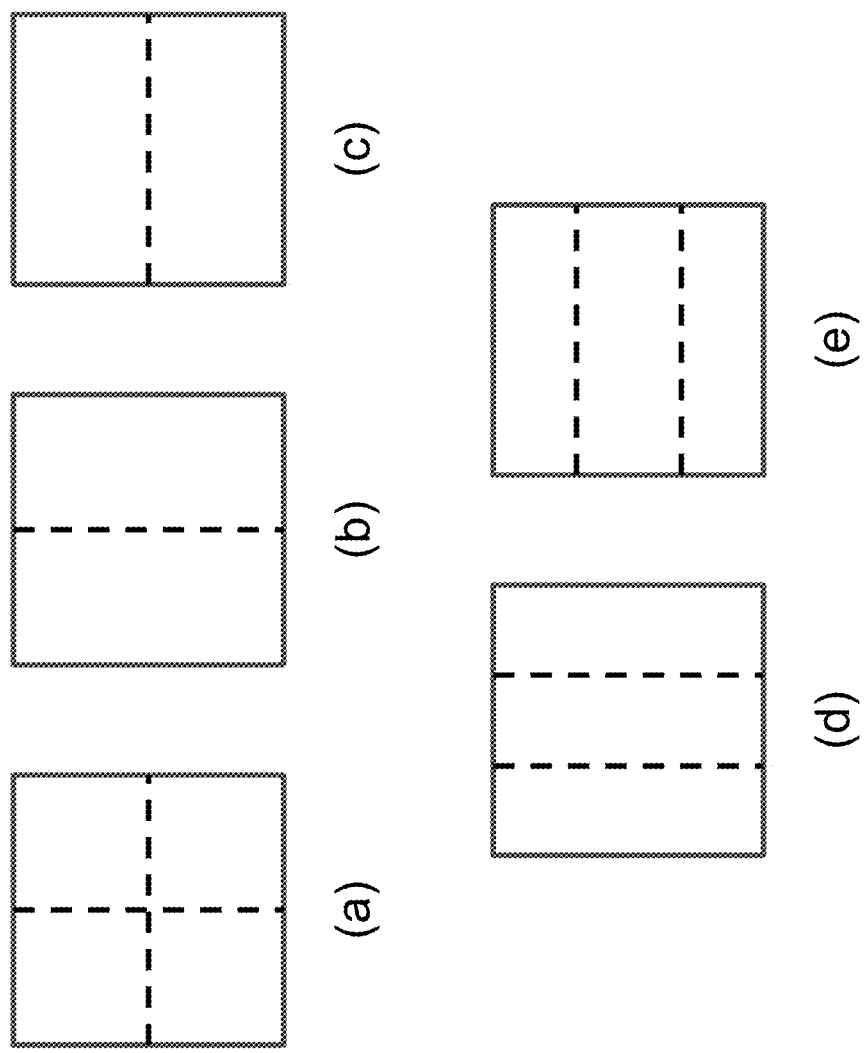
FIG. 3 shows an example of subdivision of a coding tree block (CTB) into CBs.

FIG. 3 shows an example of subdivision of a coding tree block (CTB) into CBs. Subdivision of a CTB into CBs [and transform block (TBs)]. Solid lines indicate CB borders and dotted lines indicate TB borders. (a) CTB with its partitioning. (b) corresponding quadtree.

2.1.2.1 Tree-Structured Partitioning into Transform Blocks and Units

For residual coding, a CB can be recursively partitioned into transform blocks (TBs). The partitioning is signaled by a residual quadtree. Only square CB and TB partitioning is specified, where a block can be recursively split into quadrants, as illustrated in FIG. 3. For a given luma CB of size M×M, a flag signals whether it is split into four blocks of size M/2×M/2. If further splitting is possible, as signaled by a maximum depth of the residual quadtree indicated in the SPS, each quadrant is assigned a flag that indicates whether it is split into four quadrants. The leaf node blocks resulting from the residual quadtree are the transform blocks that are further processed by transform coding. The encoder indicates the maximum and minimum luma TB sizes that it will use. Splitting is implicit when the CB size is larger than the maximum TB size. Not splitting is implicit when splitting would result in a luma TB size smaller than the indicated minimum. The chroma TB size is half the luma TB size in each dimension, except when the luma TB size is 4×4, in which case a single 4×4 chroma TB is used for the region covered by four 4×4 luma TBs. In the case of intra-picture-predicted CUs, the decoded samples of the nearest-neighboring TBs (within or outside the CB) are used as reference data for intra picture prediction.

In contrast to previous standards, the HEVC design allows a TB to span across multiple PBs for inter-picture predicted CUs to maximize the potential coding efficiency benefits of the quadtree-structured TB partitioning.

2.1.2.2 Parent and Child Nodes

A CTB is divided according to a quad-tree structure, the nodes of which are coding units. The plurality of nodes in a quad-tree structure includes leaf nodes and non-leaf nodes. The leaf nodes have no child nodes in the tree structure (i.e., the leaf nodes are not further split). The, non-leaf nodes include a root node of the tree structure. The root node corresponds to an initial video block of the video data (e.g., a CTB). For each respective non-root node of the plurality of nodes, the respective non-root node corresponds to a video block that is a sub-block of a video block corresponding to a parent node in the tree structure of the respective non-root node. Each respective non-leaf node of the plurality of non-leaf nodes has one or more child nodes in the tree structure.

2.2 Inter Prediction in HEVC/H.265

Each inter-predicted PU has motion parameters for one or two reference picture lists. Motion parameters include a motion vector and a reference picture index. Usage of one of the two reference picture lists may also be signalled using inter_pred_idc. Motion vectors may be explicitly coded as deltas relative to predictors, such a coding mode is called AMVP mode.

When a CU is coded with skip mode, one PU is associated with the CU, and there are no significant residual coefficients, no coded motion vector delta or reference picture index. A merge mode is specified whereby the motion parameters for the current PU are obtained from neighbouring PUs, including spatial and temporal candidates. The merge mode can be applied to any inter-predicted PU, not only for skip mode. The alternative to merge mode is the explicit transmission of motion parameters, where motion vector, corresponding reference picture index for each reference picture list and reference picture list usage are signalled explicitly per each PU.

When signalling indicates that one of the two reference picture lists is to be used, the PU is produced from one block of samples. This is referred to as 'uni-prediction'. Uni-prediction is available both for P-slices and B-slices.

When signalling indicates that both of the reference picture lists are to be used, the PU is produced from two blocks of samples. This is referred to as 'bi-prediction'. Bi-prediction is available for B-slices only.

The following text provides the details on the inter prediction modes specified in the existing HEVC implementation.

2.2.1 Merge Mode 2.2.1.1 Derivation of Candidates for Merge Mode

When a PU is predicted using merge mode, an index pointing to an entry in the merge candidates list is parsed from the bitstream and used to retrieve the motion information. The construction of this list is specified in the HEVC standard and can be summarized according to the following sequence of steps:

Step 1: Initial candidates derivation
Step 1.1: Spatial candidates derivation
Step 1.2: Redundancy check for spatial candidates
Step 1.3: Temporal candidates derivation
Step 2: Additional candidates insertion
Step 2.1: Creation of bi-predictive candidates
Step 2.2: Insertion of zero motion candidates These steps are also schematically depicted in FIG. 4. For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates does not reach to maximum number of merge candidate (MaxNumMergeCand) which is signalled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

In the following, the operations associated with the aforementioned steps are detailed.

2.2.1.2 Spatial Candidates Derivation

Figure 6:
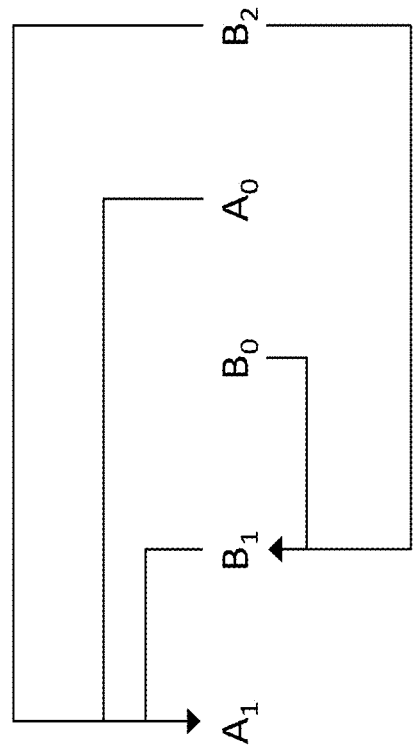
FIG. 6 shows an example of candidate pairs considered for redundancy check of spatial merge candidates.
Figure 5:
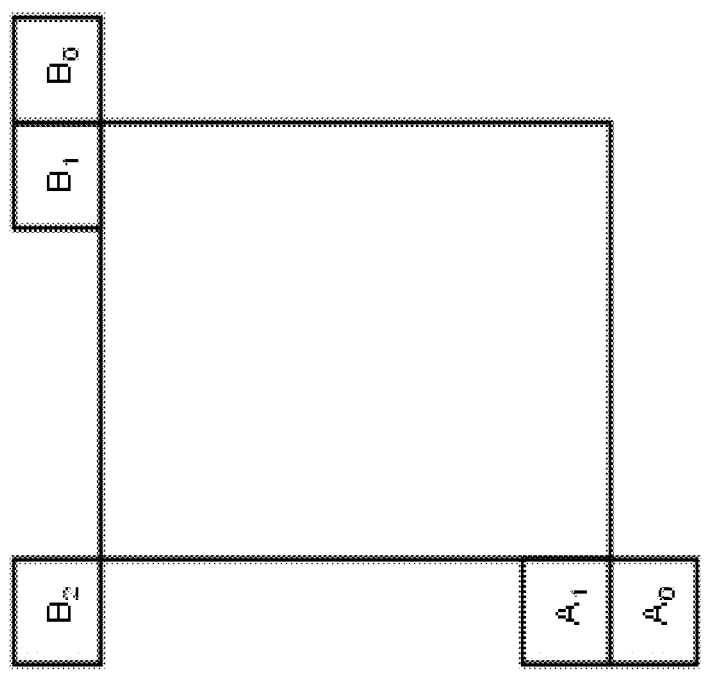
FIG. 5 shows an example of positions of spatial merge candidates.
Figure 7:
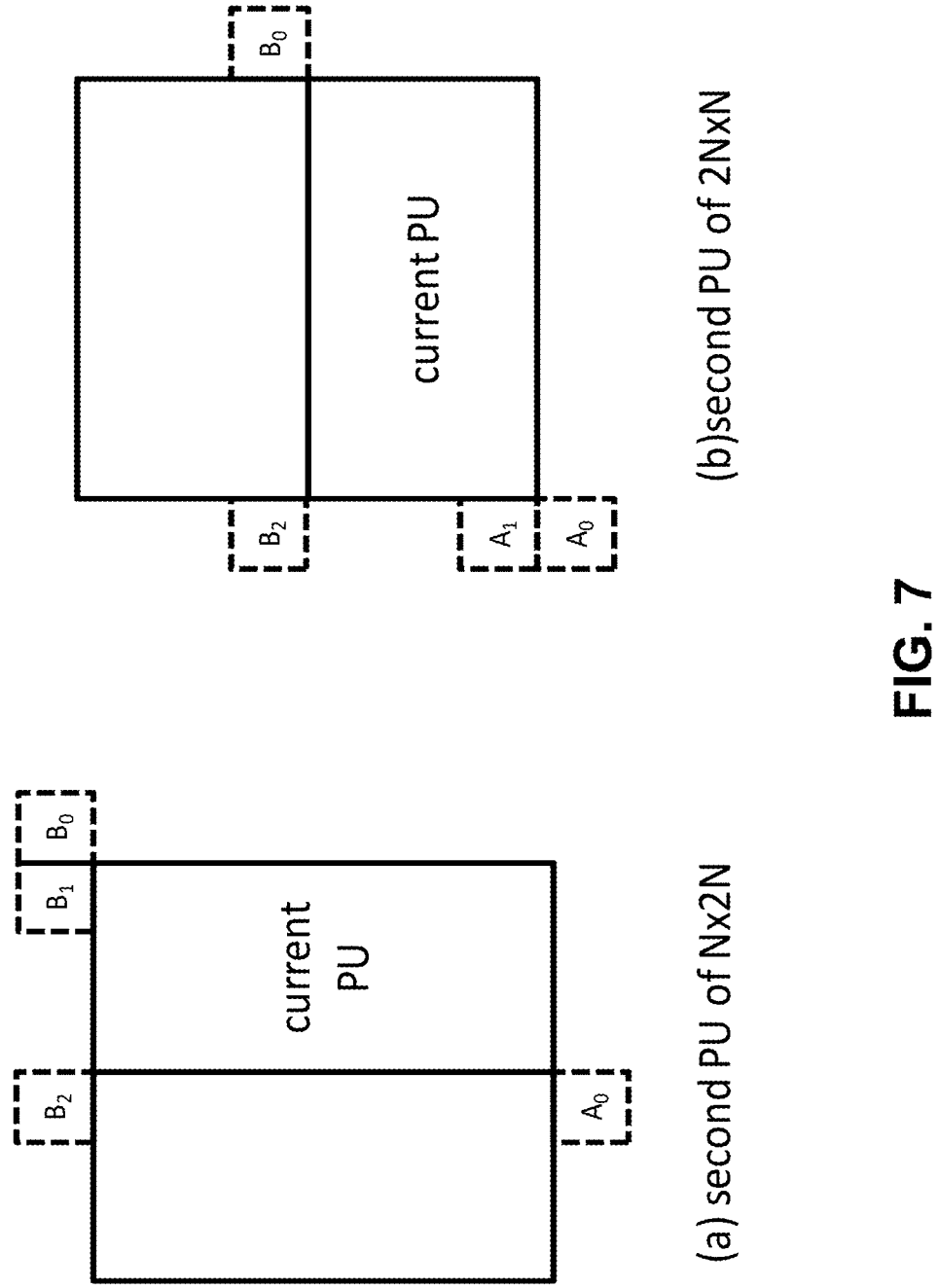
FIG. 7 shows examples of positions for a second prediction unit (PU) of N×2N and 2N×N partitions.

In the derivation of spatial merge candidates, a maximum of four merge candidates are selected among candidates located in the positions depicted in FIG. 5. The order of derivation is $A_1$, $B_1$, $B_0$, $A_0$ and $B_2$. Position $B_2$ is considered only when any PU of position $A_1$, $B_1$, $B_0$, $A_0$ is not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in FIG. 6 are considered and a candidate is only added to the list if the corresponding candidate used for redundancy check has not the same motion information. Another source of duplicate motion information is the "second PU"

associated with partitions different from 2N×2N. As an example, FIG. 7 depicts the second PU for the case of N×2N and 2N×N, respectively. When the current PU is partitioned as N×2N, candidate at position $A_1$ is not considered for list construction. In fact, by adding this candidate will lead to two prediction units having the same motion information, which is redundant to just have one PU in a coding unit. Similarly, position $B_1$ is not considered when the current PU is partitioned as 2N×N.

2.2.1.3 Temporal Candidate Derivation

In this step, only one candidate is added to the list. Particularly, in the derivation of this temporal merge candidate, a scaled motion vector is derived based on co-located PU belonging to the picture which has the smallest POC difference with current picture within the given reference picture list. The reference picture list to be used for derivation of the co-located PU is explicitly signalled in the slice header. The scaled motion vector for temporal merge candidate is obtained as illustrated by the dotted line in 13, which is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. A practical realization of the scaling process is described in the HEVC specification. For a B-slice, two motion vectors, one is for reference picture list 0 and the other is for reference picture list 1, are obtained and combined to make the bi-predictive merge candidate.

Figure 8:
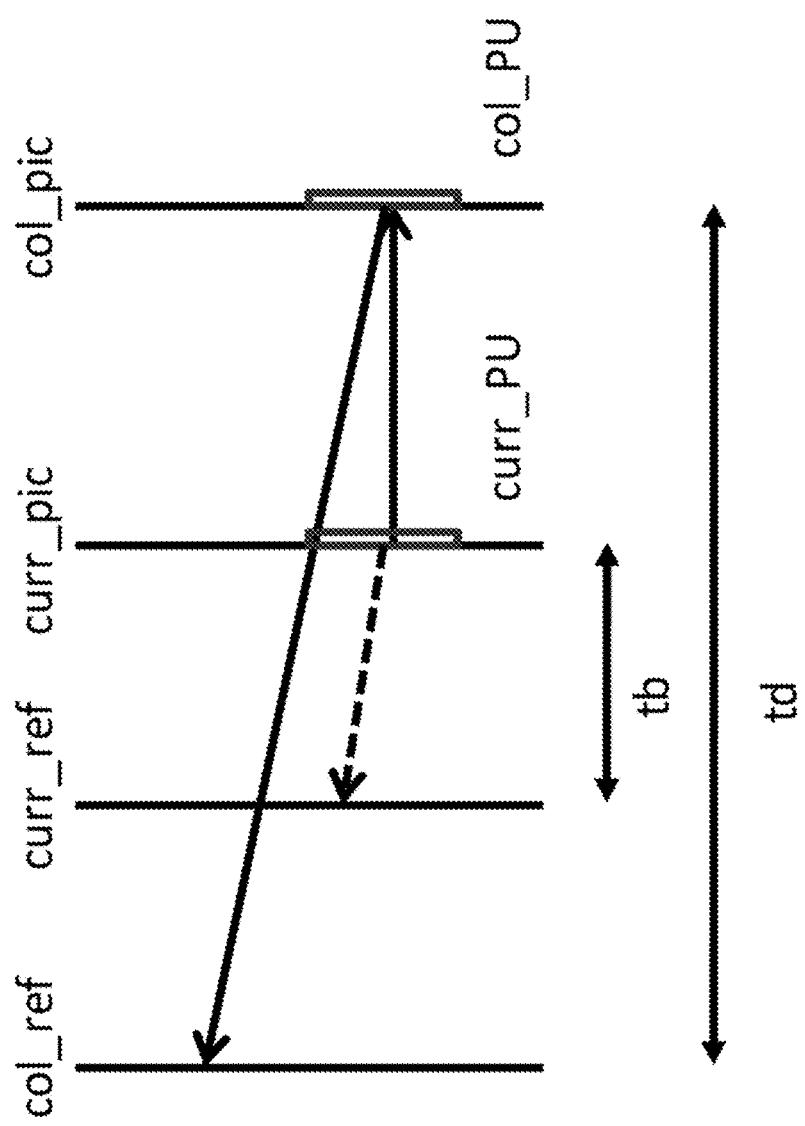
FIG. 8 shows an example of a motion vector scaling for temporal merge candidates.

FIG. 8 shows an example of a motion vector scaling for temporal merge candidates.

Figure 9:
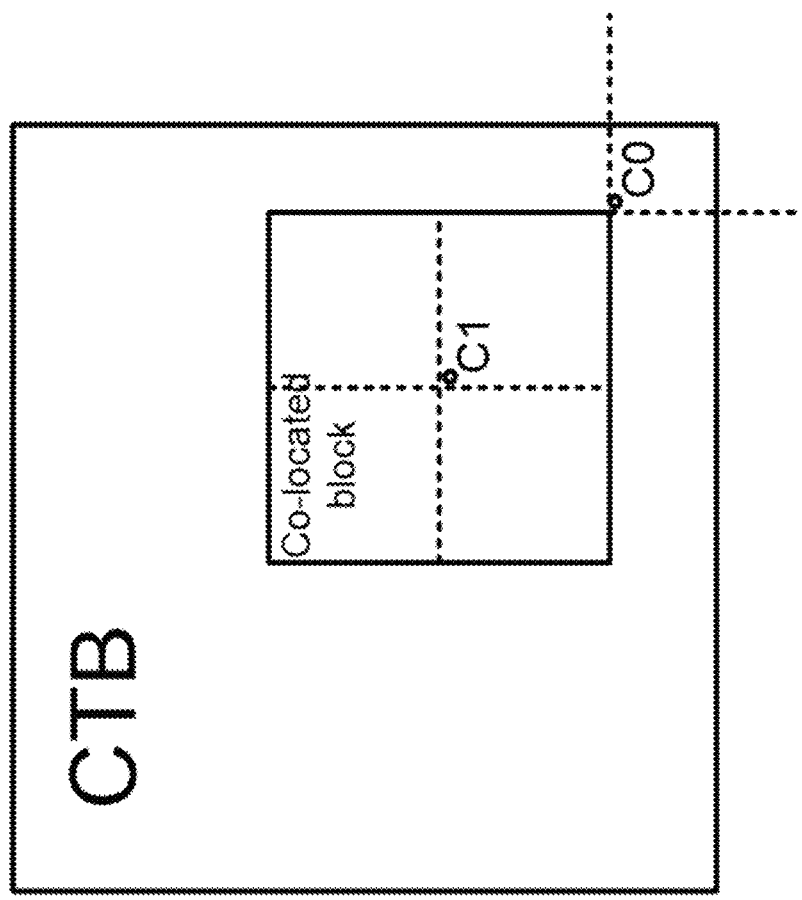
FIG. 9 shows an example of candidate positions for temporal merge candidates in a co-located picture.

In the co-located PU (Y) belonging to the reference frame, the position for the temporal candidate is selected between candidates $C_0$ and $C_1$, as depicted in FIG. 9. If PU at position $C_0$ is not available, is intra coded, or is outside of the current CTU, position $C_1$ is used. Otherwise, position $C_0$ is used in the derivation of the temporal merge candidate.

2.2.1.4 Additional Candidates Insertion

Figure 10:
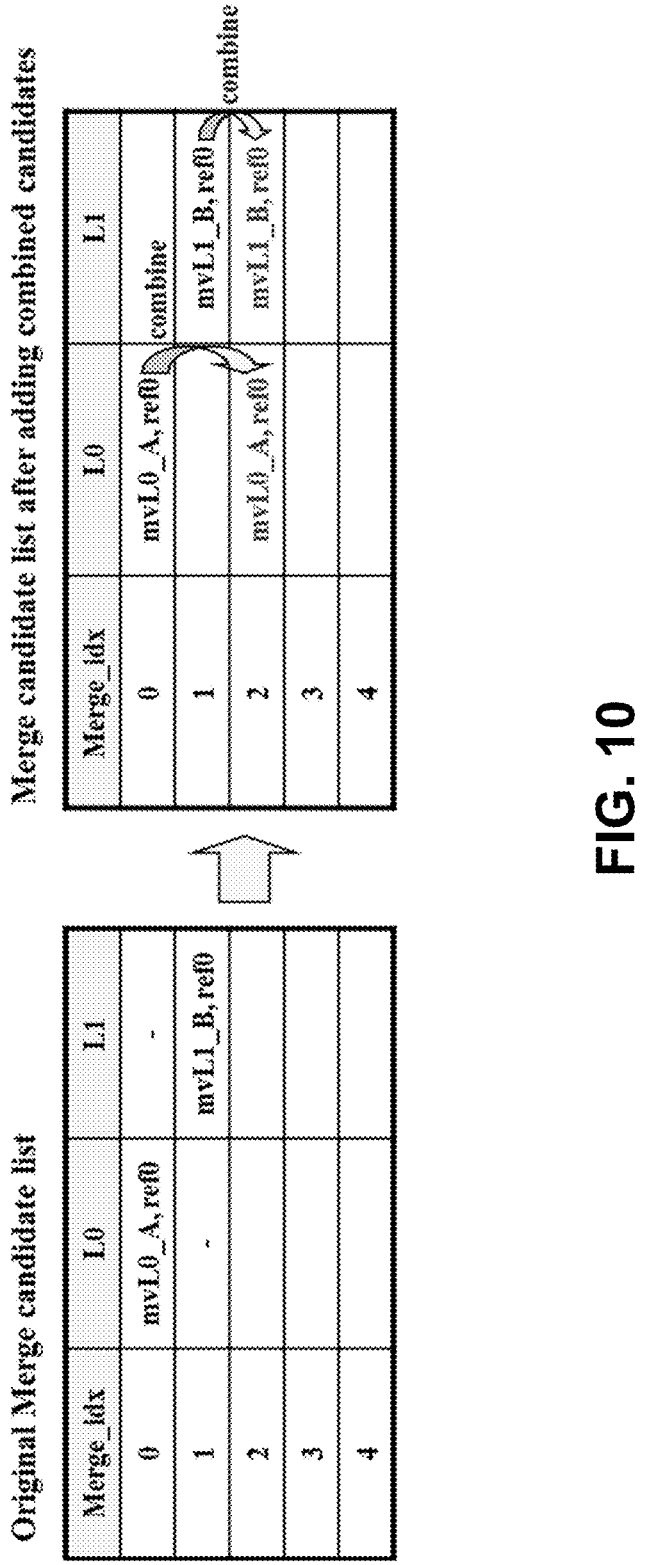
FIG. 10 shows an example of a combined bi-predictive merge candidate.

Besides spatio-temporal merge candidates, there are two additional types of merge candidates: combined bi-predictive merge candidate and zero merge candidate. Combined bi-predictive merge candidates are generated by utilizing spatio-temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate. As an example, FIG. 10 depicts the case when two candidates in the original list (on the left), which have mvL0 and refIdxL0 or mvL1 and refIdxL1, are used to create a combined bi-predictive merge candidate added to the final list (on the right). Existing implementations provide numerous rules regarding the combinations which are considered to generate these additional merge candidates.

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list. The number of reference frames used by these candidates is one and two for uni and bi-directional prediction, respectively. Finally, no redundancy check is performed on these candidates.

2.2.1.5 Motion Estimation Regions for Parallel Processing

To speed up the encoding process, motion estimation can be performed in parallel whereby the motion vectors for all prediction units inside a given region are derived simultaneously. The derivation of merge candidates from spatial neighbourhood may interfere with parallel processing as one prediction unit cannot derive the motion parameters from an adjacent PU until its associated motion estimation is completed. To mitigate the trade-off between coding efficiency and processing latency, HEVC defines the motion estimation region (MER) whose size is signalled in the picture parameter set using the "log 2_parallel_merge_level_minus2" syntax element. When a MER is defined, merge candidates falling in the same region are marked as unavailable and therefore not considered in the list construction.

7.3.2.3 Picture Parameter Set RBSP Syntax 7.3.2.3.1 General Picture Parameter Set RBSP Syntax

|  | Descriptor |
|---|---|
| pic_parameter_set_rbsp( ) { |  |
|   pps_pic_parameter_set_id | ue(v) |
|   pps_seq_parameter_set_id | ue(v) |
|   dependent_slice_segments_enabled_flag | u(1) |
|   ... |  |
|   pps_scaling_list_data_present_flag | u(1) |
|   if( pps_scaling_list_data_present_flag ) |  |
|     scaling_list_data( ) |  |
|   lists_modification_present_flag | u(1) |
|   log2_parallel_merge_level_minus2 | ue(v) |
|   slice_segment_header_extension_present_flag | u(1) |
|   pps_extension_present_flag | u(1) |
|   ... |  |
|   rbsp_trailing_bits( ) |  |
| } |  | log 2_parallel_merge_level_minus2 plus 2 specifies the value of the variable Log 2ParMrgLevel, which is used in the derivation process for luma motion vectors for merge mode as specified in clause 8.5.3.2.2 and the derivation process for spatial merging candidates as specified in clause 8.5.3.2.3. The value of log 2_parallel_merge_level_minus2 shall be in the range of 0 to CtbLog 2SizeY−2, inclusive.

The variable Log 2ParMrgLevel is derived as follows:

$$\text{Log 2ParMrgLevel} = \text{log 2\_parallel\_merge\_level\_minus2} + 2 \quad (7\text{-}37)$$

NOTE 3—The value of Log 2ParMrgLevel indicates the built-in capability of parallel derivation of the merging candidate lists. For example, when Log 2ParMrgLevel is equal to 6, the merging candidate lists for all the prediction units (PUs) and coding units (CUs) contained in a 64×64 block can be derived in parallel.

2.2.2 Motion Vector Prediction in AMVP Mode

Motion vector prediction exploits spatio-temporal correlation of motion vector with neighbouring PUs, which is used for explicit transmission of motion parameters. It constructs a motion vector candidate list by firstly checking availability of left, above temporally neighbouring PU positions, removing redundant candidates and adding zero vector to make the candidate list to be constant length. Then, the encoder can select the best predictor from the candidate list and transmit the corresponding index indicating the chosen candidate. Similarly with merge index signalling, the index of the best motion vector candidate is encoded using truncated unary. The maximum value to be encoded in this case is 2 (see FIG. 6). In the following sections, details about derivation process of motion vector prediction candidate are provided.

2.2.2.1 Derivation of Motion Vector Prediction Candidates

Figure 11:
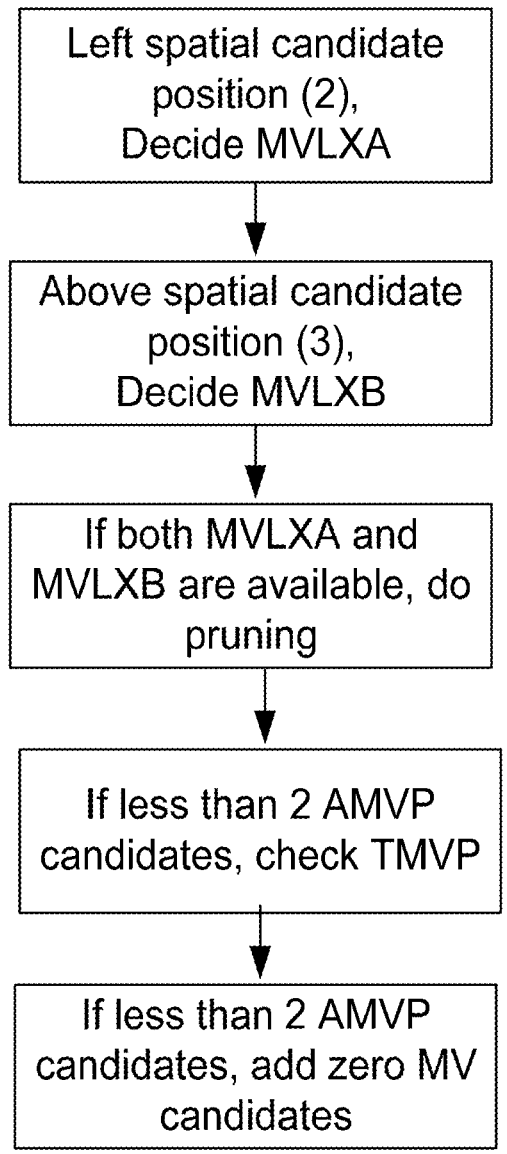
FIG. 11 shows an example of a derivation process for motion vector prediction candidates.

FIG. 11 summarizes derivation process for motion vector prediction candidate.

In motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as depicted in FIG. 5.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

2.2.2.2 Spatial Motion Vector Candidates

In the derivation of spatial motion vector candidates, a maximum of two candidates are considered among five potential candidates, which are derived from PUs located in positions as depicted in FIG. 5, those positions being the same as those of motion merge. The order of derivation for the left side of the current PU is defined as A0, A1, and scaled A0, scaled A1. The order of derivation for the above side of the current PU is defined as B0, B1, $B_2$, scaled B0, scaled B1, scaled B2. For each side there are therefore four cases that can be used as motion vector candidate, with two cases not required to use spatial scaling, and two cases where spatial scaling is used. The four different cases are summarized as follows.

No Spatial Scaling
(1) Same reference picture list, and same reference picture index (same POC)
(2) Different reference picture list, but same reference picture (same POC)
Spatial Scaling
(3) Same reference picture list, but different reference picture (different POC)
(4) Different reference picture list, and different reference picture (different POC)

The no-spatial-scaling cases are checked first followed by the spatial scaling. Spatial scaling is considered when the POC is different between the reference picture of the neighbouring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 14:
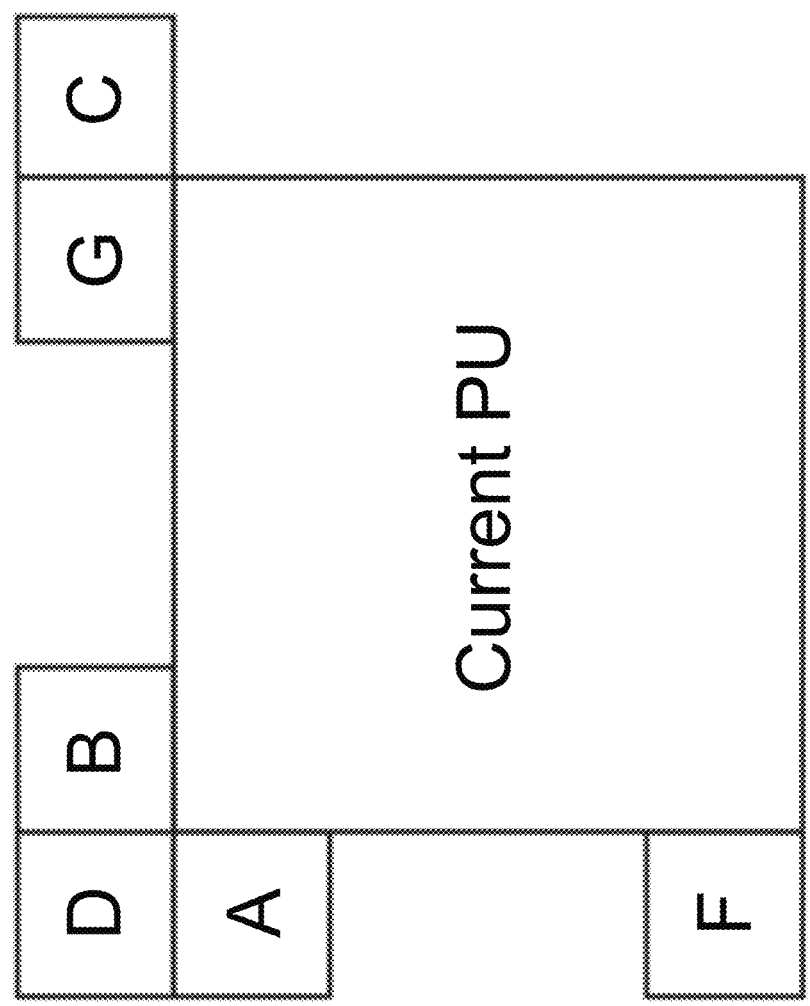
FIG. 14 shows an example of a current block and its neighboring blocks used in AVS3.

FIG. 14 shows an example of motion vector scaling for a spatial motion vector candidate.

Figure 12:
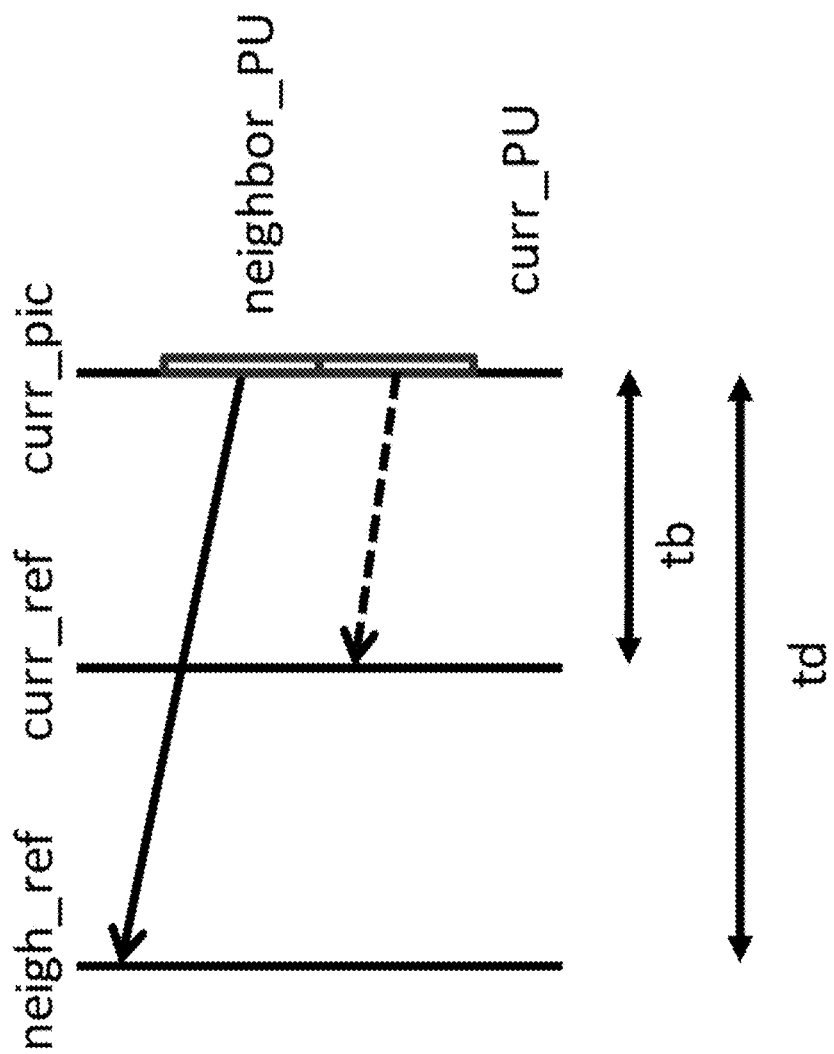
FIG. 12 shows an example of motion vector scaling for a spatial motion vector candidate.

In a spatial scaling process, the motion vector of the neighbouring PU is scaled in a similar manner as for temporal scaling, as depicted as FIG. 12. The main difference is that the reference picture list and index of current PU is given as input; the actual scaling process is the same as that of temporal scaling.

2.2.2.3 Temporal Motion Vector Candidates

Figure 4:
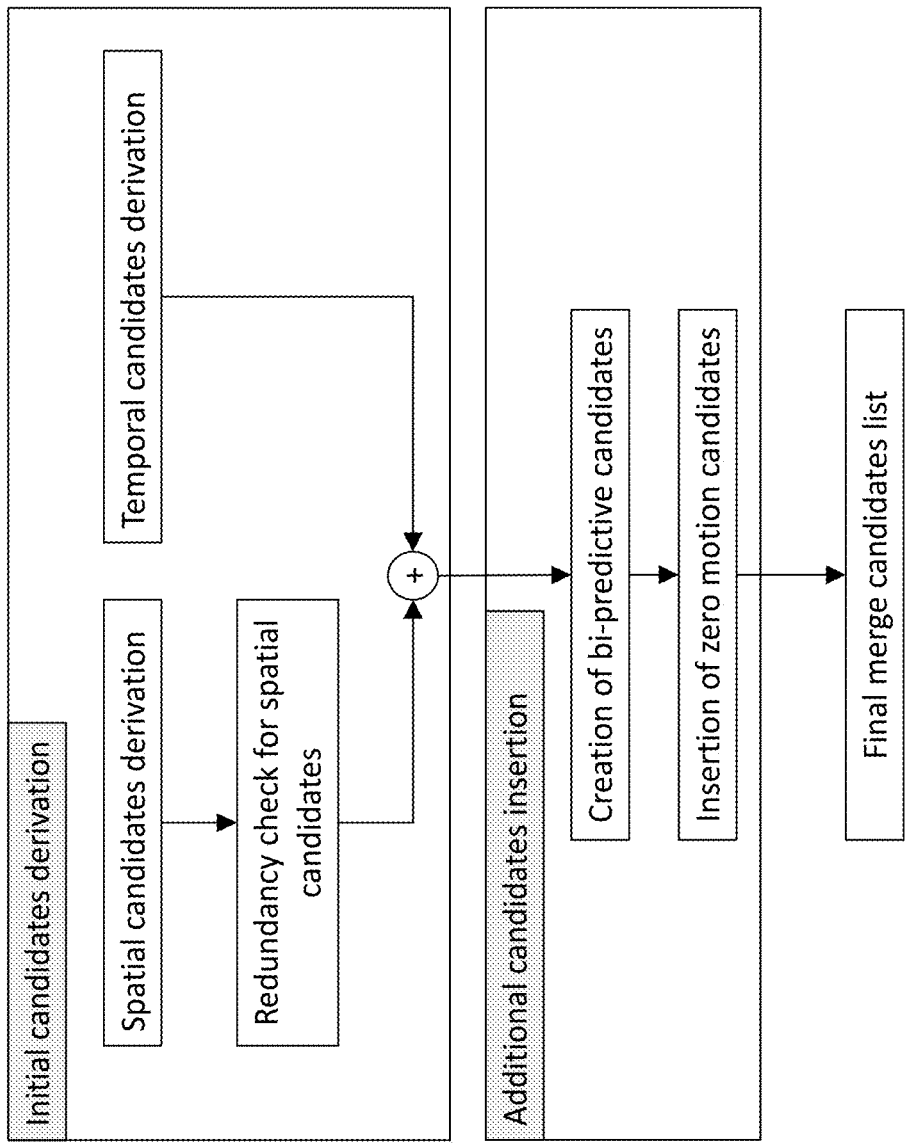
FIG. 4 shows an example of a derivation process for merge candidates list construction.

Apart for the reference picture index derivation, all processes for the derivation of temporal merge candidates are the same as for the derivation of spatial motion vector candidates (see FIG. 4). The reference picture index is signalled to the decoder.

2.2.2.4 Signalling of Merge/AMVP Information

For the AMVP mode, four parts may be signalled in the bitstream, i.e., prediction direction, reference index, MVD and my predictor candidate index (highlighted in the syntax table below). While for the merge mode, only a merge index may need to be signalled.

Syntax Tables:

7.3.6.1 General Slice Segment Header Syntax

|  | Descriptor |
|---|---|
| slice_segment_header( ) { | |
| ... | |
|     if( slice_type == P \|\| slice_type == B ) { | |
|         if( ( weighted_pred_flag && slice_type == P ) \|\| | |
|             ( weighted_bipred_flag && slice_type == B ) ) | |
|             pred_weight_table( ) | |
|         five_minus_max_num_merge_cand | ue(v) |
|         if( motion_vector_resolution_control_idc == 2 ) | |
|             use_integer_mv_flag | u(1) |
|     } | |
| ... | |

7.3.8.6 Prediction Unit Syntax

|  | Descriptor |
|---|---|
| prediction_unit( x0, y0, nPbW, nPbH ) { | |
|     if( cu_skip_flag[ x0 ][ y0 ] ) { | |
|         if( MaxNumMergeCand > 1 ) | |
|             merge_idx[ x0 ][ y0 ] | ae(v) |
|     } else { /* MODE_INTER */ | |
|         merge_flag[ x0 ][ y0 ] | ae(v) |
|         if( merge_flag[ x0 ][ y0 ] ) { | |
|             if( MaxNumMergeCand > 1 ) | |
|                 merge_idx[ x0 ][ y0 ] | ae(v) |

| | Descriptor |
|---|---|
| ``} else {`` <br> ``    if( slice_type == B )`` <br> ``        ````inter_pred_idc````[ x0 ][ y0 ]`` <br> ``    if( inter_pred_idc[ x0 ][ y0 ] != PRED_L1 ) {`` <br> ``        if( num_ref_idx_l0_active_minus1 > 0 )`` <br> ``            ````ref_idx_l0````[ x0 ][ y0 ]`` <br> ``        mvd_coding( x0, y0, 0 )`` <br> ``        ````mvp_l0_flag````[ x0 ][ y0 ]`` <br> ``    }`` <br> ``    if( inter_pred_idc[ x0 ][ y0 ] != PRED_L0 ) {`` <br> ``        if( num_ref_idx_l1_active_minus1 > 0 )`` <br> ``            ````ref_idx_l1````[ x0 ][ y0 ]`` <br> ``        if( mvd_l1_zero_flag && inter_pred_idc[ x0 ][ y0 ] == PRED_BI ) {`` <br> ``            MvdL1[ x0 ][ y0 ][ 0 ] = 0`` <br> ``            MvdL1[ x0 ][ y0 ][ 1 ] = 0`` <br> ``        } else`` <br> ``            mvd_coding( x0, y0, 1 )`` <br> ``        ````mvp_l1_flag````[ x0 ][ y0 ]`` <br> ``    }`` <br> ``  }`` <br> ``}`` | <br> <br> ae(v) <br> <br> <br> ae(v) <br> <br> ae(v) <br> <br> <br> <br> ae(v) <br> <br> <br> <br> <br> <br> <br> ae(v) |

7.3.8.9 Motion Vector Difference Syntax

| | Descriptor |
|---|---|
| ``mvd_coding( x0, y0, refList ) {`` <br> ``    ````abs_mvd_greater0_flag````[ 0 ]`` <br> ``    ````abs_mvd_greater0_flag````[ 1 ]`` <br> ``    if( abs_mvd_greater0_flag[ 0 ] )`` <br> ``        ````abs_mvd_greater1_flag````[ 0 ]`` <br> ``    if( abs_mvd_greater0_flag[ 1 ] )`` <br> ``        ````abs_mvd_greater1_flag````[ 1 ]`` <br> ``    if( abs_mvd_greater0_flag[ 0 ] ) {`` <br> ``        if( abs_mvd_greater1_flag[ 0 ] )`` <br> ``            ````abs_mvd_minus2````[ 0 ]`` <br> ``        ````mvd_sign_flag````[ 0 ]`` <br> ``    }`` <br> ``    if( abs_mvd_greater0_flag[ 1 ] ) {`` <br> ``        if( abs_mvd_greater1_flag[ 1 ] )`` <br> ``            ````abs_mvd_minus2````[ 1 ]`` <br> ``        ````mvd_sign_flag````[ 1 ]`` <br> ``    }`` <br> ``}`` | <br> ae(v) <br> ae(v) <br> <br> ae(v) <br> <br> ae(v) <br> <br> <br> ae(v) <br> ae(v) <br> <br> <br> <br> ae(v) <br> ae(v) |

Semantics five_minus_max_num_merge_cand specifies the maximum number of merging MVP candidates supported in the slice subtracted from 5. The maximum number of merging MVP candidates, MaxNumMergeCand is derived as follows:

$$\text{MaxNumMergeCand}=5-\text{five\_minus\_max\_num\_merge\_cand} \quad (7\text{-}53)$$

The value of MaxNumMergeCand shall be in the range of 1 to 5, inclusive.

merge_flag[x0][y0] specifies whether the inter prediction parameters for the current prediction unit are inferred from a neighbouring inter-predicted partition. The array indices x0, y0 specify the location (x0, y0) of the top-left luma sample of the considered prediction block relative to the top-left luma sample of the picture.

When merge_flag[x0][y0] is not present, it is inferred as follows:

If CuPredMode[x0][y0] is equal to MODE_SKIP, merge_flag[x0][y0] is inferred to be equal to 1.

Otherwise, merge_flag[x0][y0] is inferred to be equal to 0.

merge_idx[x0][y0] specifies the merging candidate index of the merging candidate list where x0, y0 specify the location (x0, y0) of the top-left luma sample of the considered prediction block relative to the top-left luma sample of the picture.

2.3 Coding Structure in AVS2

Figures 13A, 13B:
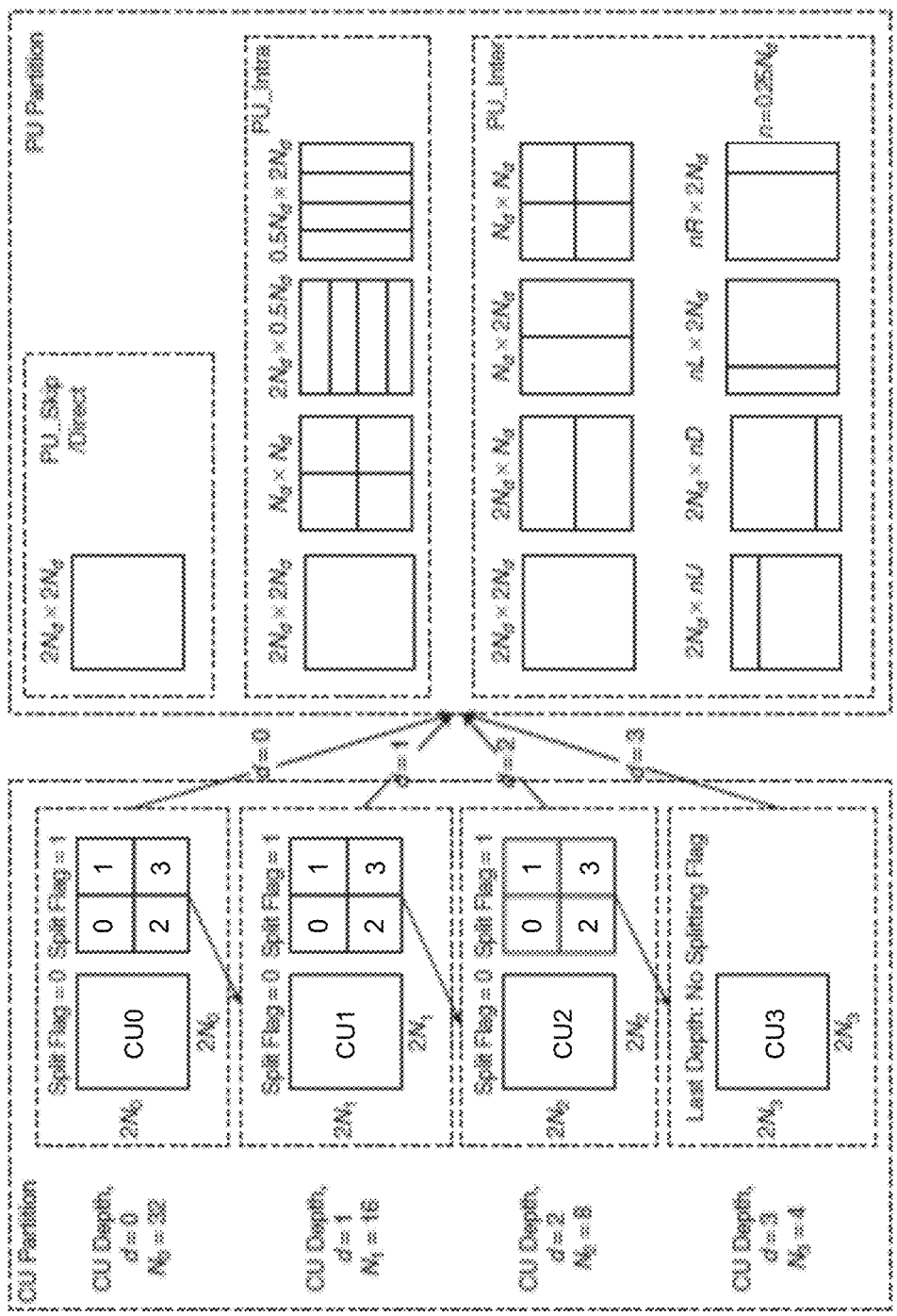
FIGS. 13A and 13B show examples of possible recursive CU/PU structures.

Similar to HEVC, AVS2 also adopts the concept of CU, PU and TU-based coding/prediction/transform structure. First, pictures are split into largest coding units (LCUs), which consist of 2N×2N samples. One LCU can be a single CU or can be split into four smaller CUs with a quad-tree partition structure; a CU can be recursively split until it reaches the smallest CU size limit, as shown in FIG. 13A. once the splitting of the Cu hierarchical tree is finished, the leaf node CUs can be further split into PUs. PU is the basic unit for intra- and inter prediction and allows multiple different shapes to encoder irregular image patterns, as shown in FIG. 13B. In FIG. 13A, the maximum possible recursive CU structure in AVS2 is shown, e.g. LCU size=64, maximum hierarchical depth=4; FIG. 13B shows possible PU splitting for skip, intra modes, and inter modes in AVS2, including symmetric and asymmetric prediction (d=1, 2 for intra prediction; and d=0, 1, 2 for inter prediction).

2.4 Inter Prediction in AVS2/AVS3

Similar to HEVC, there are two inter-coded frame types, P frame and B frame. A P frame is a forward-predicted frame using a single reference picture, while a B frame is a bipredicted frame that consists of forward, backward, bi-prediction, and symmetric prediction, using two reference frames. In a B frame, in addition to the conventional forward, backward, bi-directional, and skip/direct prediction modes, symmetric prediction is defined as a special bi-prediction mode, wherein only one forward motion vector (MV) is coded and the backward MV is derived from the forward MV based on the picture-order-counter (POC) distances. The symmetry mode could efficiently represent the linear motion model of an object.

2.4.1 Syntax and Semantics for a Coding Unit

```
coding_unit ( SizeInBit, PositionInPic ) {
    if ( PictureType != 0)
        cu_type_index                                                          ae(v)
    if ( ( CuTypeIndex == 3 || CuTypeIndex == 4 ) && ( AsymmetricMotionPartitionsEnable ==
1 ) && SizeInBit > 3 )
        shape_of_partition_index                                               ae(v)
    if ( PictureType == 2 && CuTypeIndex >= 2 && CuTypeIndex <= 4) )
        if ( CuTypeIndex == 2 || SizeInBit > 3 )
            b_pu_type_index                                                    ae(v)
        else
            b_pu_type_min_index                                                ae(v)
    if ( CuType == 'B_Skip' || CuType == 'B_Direct_2N' )
        cu_subtype_index                                                       ae(v)
    if ( CuType != 'P_Skip' && CuType != 'B_Skip' && CuType != 'F_Skip' && CuType !=
'S_Skip' ) {
        if ( CuType == 'B_NxN' ) {
            for (i=0; i<4; i++)
                b_pu_type_index2[i]                                            ae(v)
        }
        if ( IntraCuFlag == 1 ) {
            if ( (SizeInBit == 3) || ((NsipEnableFlag==1) && (3<SizeInBit<6) ) )
                transform_split_flag                                           ae(v)
            if (NsipEnableFlag==1 && (SizeInBit==4 || SizeInBit==5) &&
TransformSplitFlag==1)
                intra_pu_type_index
            for ( i=0; i<NumOfIntraPredBlock; i++ )
                intra_luma_pred_mode                                           ae(v)
            if ( chroma_format != '00' )
                intra_chroma_pred_mode                                         ae(v)
        }
        if ( (PictureType == 1 || PictureType == 3) && RefPicNum > 1 ) {
            for ( i = 0; i < CuMvNum; i++ )
                pu_reference_index                                             ae(v)
        }
        for ( i = 0; i < maxPredUnitOrder; i++ ) {
            if ( FwdMVExist ) {
                mv_diff_x_abs                                                  ae(v)
                if ( MvDiffXAbs )
                    mv_diff_x_sign                                             ae(v)
                mv_diff_y_abs                                                  ae(v)
                if ( MvDiffYAbs )
                    mv_diff_y_sign                                             ae(v)
            }
        }
        for ( i = maxPredUnitOrder; i < 2xmaxPredUnitOrder; i++ ) {
            if ( BckMVExist ) {
                mv_diff_x_abs                                                  ae(v)
                if ( MvDiffXAbs )
                    mv_diff_x_sign                                             ae(v)
                mv_diff_y_abs                                                  ae(v)
                if ( MvDiffYAbs )
                    mv_diff_y_sign                                             ae(v)
            }
        }
    }
}
```

Taking B frame as an example, based on CuTypeIndex and ShapeOfPartitionIndex, and table 81 bleow to derive CU type (CuType), prediction partition types and PU prediction mode (PuPredMode).

TABLE 81

CU types and related information for B frames

| CuTypeIndex | ShapeOfPartitionIndex | CuType | PUPartTye | PuPredMode |
|---|---|---|---|---|
| 0 | — | B_Skip | From Table 82 | From Table 82 |
| 1 | — | B_Direct_2N | From Table 82 | From Table 82 |
| 2 | — | B_2N | NO_SPLIT | From Table 83 |
| 3 | 0 | B_2N_H | HOR_SYM | From Table 84 |
| 3 | 1 | B_2N_HU | HOR_UP | |
| 3 | 2 | B_2N_HD | HOR_DOWN | |
| 4 | 0 | B_2N_V | VER_SYM | |
| 4 | 1 | B_2N_VL | VER_LEFT | |
| 4 | 2 | B_2N_VR | VER_RIGHT | |

TABLE 81-continued

CU types and related information for B frames

| CuTypeIndex | ShapeOfPartitionIndex | CuType | PUPartTye | PuPredMode |
|---|---|---|---|---|
| 5 | — | B_NxN | CROSS_SPLIT | From Table 85 |
| 6 | — | From Table 79 | | — |

TABLE 82 subCU type and related information for B frames

| CuType | CuSubtypeIdx | SizeInBit | SubCUType | PUPartTye | PuPredMode | Number of MVs |
|---|---|---|---|---|---|---|
| B_Skip | 0 | >3 | B_Skip_Sym | CROSS_SPLIT | Symmtric | 0 |
| | 0 | 3 | B_Skip_Sym | NO_SPLIT | Symmtric | 0 |
| | 1 | — | B_Skip_Spatial_Bi | NO_SPLIT | Bi-direction | 0 |
| | 2 | — | B_Skip_Spatial_Bck | NO_SPLIT | Backward | 0 |
| | 3 | — | B_Skip_Spatial_Sym | NO_SPLIT | Symmtric | 0 |
| | 4 | — | B_Skip_Spatial_Fwd | NO_SPLIT | Forward | 0 |
| B_Direct_2N | 0 | >3 | B_Direct_2N_Sym | CROSS_SPLIT | Symmtric | 0 |
| | 0 | 3 | B_Direct_2N_Sym | NO_SPLIT | Symmtric | 0 |
| | 1 | — | B_Direct_2N_Spatial_Bi | NO_SPLIT | Bi-direction | 0 |
| | 2 | — | B_Direct_2N_Spatial_Bck | NO_SPLIT | Backward | 0 |
| | 3 | — | B_Direct_2N_Spatial_Sym | NO_SPLIT | Symmtric | 0 |
| | 4 | — | B_Direct_2N_Spatial_Fwd | NO_SPLIT | Forward | 0 |

2.4.2 Multi-Motion Model Based Skip/Direct Modes

The SKIP mode's motion information of the current block is derived from previously decoded blocks and no residual information is encoded. Similar to SKIP mode, DIRECT mode has no motion information to transmit while prediction residuals and mode information are transmitted.

As an expansion of traditional SKIP and DIRECT modes wherein motion information from only one temporal prediction block (CuSubtypeIdx equal to 0) is utilized, four additional motion models based SKIP and DIRECT modes are introduced in AVS2 and AVS3, i.e. bi-direction DIRECT/SKIP mode(CuSubtypeIdx equal to 1), symmetry DIRECT/SKIP mode (CuSubtypeIdx equal to 2), backward DIRECT/SKIP mode (CuSubtypeIdx equal to 3) and forward DIRECT/SKIP mode (CuSubtypeIdx equal to 4).

A priority-based motion information derivation method is designed which takes block's motion model (prediction direction) into consideration. A higher priority is assigned to the motion information of neighbor blocks with the same motion model as current block.

For each of the four additional motion model based skip/direct mode, the motion information derivation process can be divided into three steps performed in order.

Motion model-matched search: As shown in FIG. 14, an initial process of finding neighbor blocks with the same motion model as current block at positions F, G, C, A, B, D is conducted in that order. Once the first block sharing the same motion model with current block is found, the motion information of that block is assigned to current block.

Artificial search: In case of there isn't a neighbor block sharing the same motion model with current block (i.e., no result found from step 1)), a second process of artificial constructing motion information of current block is conducted. This process varies from one motion model to another.

For bi-direction DIRECT/SKIP mode, count how many spatial neighbors are coded with forward-direction, denoted by Nfw and how many spatial neighbors are coded with backward-direction, denoted by Nbw. If Nfw and Nbw are both equal to or larger than 1, the combination of the first forward and the first backward prediction blocks' motion information is assigned to current block. The searching order is the same as the 1st step, i.e., from positions F, G, C, A, B, and D.

For symmetry DIRECT/SKIP mode, the following steps are performed in order:

count how many spatial neighbors are coded with bi-direction, denoted by Nbi

If Nbi is equal to or larger than 2, the motion information of neighbor bi-direction predicted blocks' motion information of the last block in scanning order of F, G, C, A, B and D (which is equal to the first block in the scanning order of D, B, A, C, G and F) is assigned to current block.

else (if Nbi is smaller than 2) if Nbw is equal to or larger than 1 wherein Nbw denotes how many spatial neighbors are coded with backward-direction, the backward motion vector (denoted by MvE1) of the first backward prediction blocks' motion information is assigned to current block and the forward motion vector MvE0 is set equal to Clip3(−32768, 32767, −MvE1). The searching order is the same as the 1st step, i.e., from positions F, G, C, A, B, and D.

else (if Nbi is smaller than 2 and Nbw is smaller than 1) if Nfw is equal to or larger than 1 wherein Nfw denotes how many spatial neighbors are coded with forward-direction, the forward motion vector (denoted by MvE0) of the first forward prediction blocks' motion information is assigned to current block and the backward motion vector MvE1 is set equal to Clip3(−32768, 32767, −MvE0). The searching order is the same as the 1st step, i.e., from positions F, G, C, A, B, and D.

For backward DIRECT/SKIP mode, count how many spatial neighbors are coded with bi-direction, denoted by Nbi. the backward motion information of the last neighbor bi-direction predicted block is assigned to current block. The searching order is the same as the 1st step, i.e., from positions F, G, C, A, B, and D.

For forward DIRECT/SKIP mode, count how many spatial neighbors are coded with bi-direction, denoted by Nbi. the forward motion information of the last neighbor bi-direction predicted block is assigned to current block. The searching order is the same as the 1st step, i.e., from positions F, G, C, A, B, and D.

Default MVs construction: this step is invoked only when both step 1) and step 2) fail to find available motion vectors. In AVS2/AVS3, the following applies:

For bi-direction/symmetry skip/direct modes, zero motion vectors are set for both forward and backward directions.

For backward DIRECT/SKIP mode, the backward motion vector is set to be a zero MV, i.e., (0, 0)

For forward DIRECT/SKIP mode, the forward motion vector is set to be a zero MV, i.e., (0, 0).

Since there are multiple SKIP and DIRECT modes, it would be required to bring some side information in signaling SKIP and DIRECT modes' motion model. In AVS2 reference software RD3.0, the Rate-distortion optimization method is used to select a mode to encode a block. The side information is taken into consideration to yield a more accurate cost value when calculate the RD-cost of the new SKIP and DIRECT modes.

3. Examples of Problems Solved by Embodiments

The AVS2/AVS3 multi-motion model based skip/direct mode takes the correlation of motion model between current block and its adjacent neighbouring blocks. However, it couldn't take the advantage of similarity between current block and non-adjacent blocks. Use of previously coded motion information in history for better motion vector prediction can be used. Similar ideas could be also be applied to the multi-direction skip/direct modes with some details to be developed to fit the design in AVS2/AVS3.

In addition, for each motion model, only one candidate is allowed which may restrict the coding gain of motion prediction.

4. Examples Embodiments of the Disclosed Technology

To address the problem, several methods including using one or more look up tables (LUTs, to store the motion information in the history) to predict motion information of a block. The LUT-based motion vector prediction techniques using one or more look up tables with at least one motion candidate stored to predict motion information of a block can be implemented in various embodiments to provide video coding with higher coding efficiencies. Each LUT can include one or more motion candidates, each associated with corresponding motion information. Motion information of a motion candidate can include partial or all of the prediction direction, reference indices/pictures, motion vectors, LIC flags, affine flags, Motion Vector Derivation (MVD) precisions, and/or MVD values. Motion information may further include the block position information to indicate wherein the motion information is coming from.

The LUT-based motion vector prediction based on the disclosed technology, which may enhance both existing and future video coding standards, is elucidated in the following examples described for various implementations. Because the LUTs allow the encoding/decoding process to be performed based on historical data (e.g., the blocks that have been processed), the LUT-based motion vector prediction can also be referred to as History-based Motion Vector Prediction (HMVP) method. In the LUT-based motion vector prediction method, one or multiple tables with motion information derived from previously coded blocks are maintained during the encoding/decoding process. During the encoding/decoding of one block, the associated motion information in LUTs may be added to the motion candidate lists (e.g., AMVP/merge list), and after encoding/decoding one block, LUTs may be updated. The updated LUTs are then used to code the subsequent blocks. That is, the updating of motion candidates in the LUTs are based on the encoding/decoding order of blocks. The examples below should be considered as examples to explain general concepts. These examples should not be interpreted in a narrow way. Furthermore, these examples can be combined in any manner.

The entry to a LUT is a motion candidate. Please note, we use HMVP (history-based motion vector predictor) candidate to indicate a set of motion information stored in a look up table.

The detailed embodiment examples below should be considered as examples to explain general concepts. These embodiments should not be interpreted in a narrow way. Furthermore, these embodiments can be combined in any manner.

1. For a given motion model, HMVP candidates or motion candidates from non-adjacent spatial blocks or temporal blocks belonging to the same motion model may be used to be a candidate for the multi-motion model based methods (e.g., SKIP/DIRECT modes design in AVS2).
   a. In one example, before performing the artificial searching process, HMVP candidates or motion candidate from non-adjacent spatial blocks or temporal blocks may be checked in order. If there is one HMVP candidate or one motion candidate from non-adjacent spatial blocks or temporal blocks belonging to the same motion model, it is marked as the final motion candidate and the searching process terminates.
   b. In one example, before performing the default MVs construction process, HMVP candidates or motion candidate from non-adjacent spatial blocks or temporal blocks may be checked in order. If there is one HMVP candidate or one motion candidate from non-adjacent spatial blocks or temporal blocks belonging to the same motion model, it is marked as the final motion candidate and the searching process terminates.
   c. In one example, HMVP candidates or motion candidates from non-adjacent spatial blocks or temporal blocks may be considered in the artificial searching process. For example, HMVP candidates may be searched after positions F, G, C, A, B, and D. In this case, one HMVP candidate or motion candidate from a non-adjacent spatial block or temporal block may be treated as one candidate from a relative position like those from adjacent spatial blocks.
2. Motion models defined in multi-motion model based methods (e.g., SKIP/DIRECT modes design in AVS2) may be further extended to cover the usage of HMVP. That is, HMVP candidates may be treated as new motion models and added to the candidate list in multi-motion model based method.
   a. In one example, for each entry of the LUTs storing HMVP candidates is treated as a new motion model.
   b. Alternatively, all HMVP candidates are treated to be one new motion model. An indication of motion model may be firstly signaled, followed by the index of the HMVP candidates if the indication tells it is belonging to HMVP category.
3. Motion models defined in in multi-motion model based methods (e.g., SKIP/DIRECT modes in AVS2) may be further extended to cover the usage of motion information from non-adjacent blocks. That is, motion information from non-adjacent blocks may be treated as new motion models and added to candidate list in the in multi-motion model based method.
   a. In one example, for each motion candidate of non-adjacent blocks is treated as a new motion model.
   b. Alternatively, all motion candidates from non-adjacent blocks are treated to be one new motion model, named non-adjacent motion category. An indication of motion model may be firstly signaled, followed by the index of motion candidates from non-adjacent blocks if the indication tells it is belonging to non-adjacent motion category.
4. New motion models may be inserted before/after existing motion models in AVS2/AVS3.
   a. In one example, all HMVP candidates are inserted after all the existing motion models.
   b. Alternatively, some HMVP candidates are inserted before some existing motion models in AVS2/AVS3, while other HMVP candidates are inserted after all existing motion models in AVS2/AVS3.
   c. The whole list of candidates (temporal, bi-direction, symmetry, backward and forward, motion model for HMVP and/or non-adjacent blocks) may be reordered after each model finds its related candidates.
      i. In one example, the zero motion candidates in all or multiple motion models like bi-direction, symmetry, backward and forward may be replaced by motion candidate from other motion models.
5. Similarly to the design of HMVP in PCT/CN2018/093663 and, PCT/CN2018/093987, the coded motion information from previously coded blocks may be used as a predictor for coding current block. However, the coded motion information is classified and inserted to multiple look up tables based on the motion model.
   a. In one example, the categories of motion models used in HMVP process are the same as those used in multi-motion model based methods (e.g., SKIP/DIRECT modes in AVS2), i.e., bi-direction, symmetric direction, backward, forward.
   b. Alternatively, only partial of motion models defined in SKIP/DIRECT modes are used in HMVP process to reduce the required memory for storing HMPV candidates for all kinds of motion models.
6. Instead of only allowing one candidate for each motion model as in multi-motion model based methods (e.g., the SKIP/DIRECT mode of AVS2), multiple candidates for one motion model are allowed. That is, a candidate list for each motion model may be constructed.
   a. In one example, an index of the multiple candidates may be further signaled. In this case, two syntax elements are involved (the first to indicate the motion model and the second to indicate a candidate index of the candidate list corresponding the selected motion model).
   b. Alternatively, one of the multiple candidates may be selected at the decoder side without being signaled.
   c. Alternatively, only one candidate list is constructed however, multiple candidates with the same motion model may be added. In this case, only one index may be signaled.
   d. In one example, multiple candidates may be derived from adjacent spatial neighboring blocks with the same motion model.
   e. In one example, multiple candidates may be derived from non-adjacent spatial neighboring blocks with the same motion model.
   f. In one example, multiple candidates may be derived from HMVP candidates with the same motion model.
   g. In one example, multiple candidates may be derived from either one of the three steps (Motion model-matched search, artificial search, default MVs) used in the SKIP/DIRECT mode.
   h. The size of allowed multiple candidates for all motion models may be the same.
   i. Alternatively, the size of allowed multiple candidates for different motion models may be different.
   j. The size(s) of allowed multiple candidates may be pre-defined or signaled in sequence parameter set/picture parameter set/slice header, etc. al.
   k. The size(s) of allowed multiple candidates may further depend on block sizes/block shapes/coded mode (skip or direct)/picture or slice types/low delay check flags.
7. The searching order and/or searching points (spatial/temporal neighboring blocks) in the multi-motion model based solutions may depend on the motion model.
   a. In one example, different searching orders may be utilized for different motion models. The orders may be pre-defined.
   b. In one example, the searching order may be adaptively changed from block to block.
   c. In one example, the searching order may be adaptively changed based on the searching results of another motion model.
   d. In one example, the searching order and/or searching points (spatial/temporal neighboring blocks) in the multi-motion model based solutions may depend on block shape/block size/coded mode, etc. al.
8. Pruning may be applied between a HMVP candidate with a candidate from non-adjacent spatial block or temporal block.
   a. If two candidates are identical or motion vector differences are smaller than threshold(s), only one of the two could be added to the candidate list.
9. Pruning may be applied between a HMVP candidate with a candidate derived from existing multi-model motion based SKIP/DIRECT mode design.
   a. Similarly, pruning may be applied between a candidate from non-adjacent spatial block or temporal block with a candidate derived from existing SKIP/DIRECT mode design.
   b. In one example, the candidate derived from existing SKIP/DIRECT mode design indicates a candidate found in the 'Motion model-matched search' process in section 2.4.2.
   c. In one example, the candidate derived from existing SKIP/DIRECT mode design indicates the candidate found after the 'default MVs construction' process in section 2.4.2.
   d. In one example, pruning process is skipped if the candidate derived from existing multi-model motion based SKIP/DIRECT mode design is from the 'Artificial search process' or 'default MVs construction process'.
10. In one example, pruning operation is conducted only between MV candidates of the same motion model.
11. In one example, there is an individual historical MV list for each motion model. When a motion model is searched, the MV candidate in the historical MV list for that model can be added to the merge candidate list.
   a. In one embodiment, historical MV list is built for only some motion models, such as the bi-prediction model and the symmetric prediction model, but not built for some other models, such as the forward-prediction model and the backward-prediction model.
   b. In one embodiment, the historical MV list for a motion model is updated only after coding/decoding an inter-coded block with the MV of that motion model.
12. The coding of cu_subtype_index may be extended to allow it to include multiple candidates in addition to the five existing motion models.
   a. In one example, truncated binarization method may be utilized.
   b. In one example, each bin may be coded with contexts.
   c. In one example, partial bins may be coded with contexts and the remaining bins may be coded with bypass mode.
13. The total number of allowed motion models may be pre-defined.
   a. Alternatively, the total number of allowed motion models may be signaled in sequence header, picture header, slice header.
   b. In one example, each HMVP candidate may be treated as one motion model in terms of the signaling of allowed motion models.
14. It is proposed that when a block is coded with a HMVP candidate (i.e., from the look-up-table which stores motion information from previously coded blocks), such a candidate is not used to update the LUT.

Figure 15:
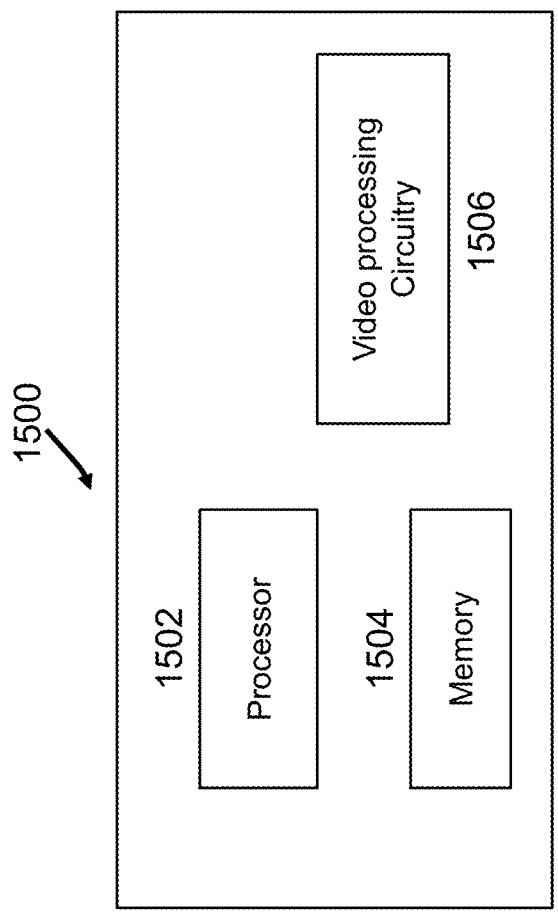
FIG. 15 is a block diagram of an example of a video processing apparatus.

FIG. 15 is a block diagram of a video processing apparatus 1500. The apparatus 1500 may be used to implement one or more of the methods described herein. The apparatus 1500 may be embodied in a smartphone, tablet, computer, Internet of Things (IoT) receiver, and so on. The apparatus 1500 may include one or more processors 1502, one or more memories 1504 and video processing hardware 1506. The processor(s) 1502 may be configured to implement one or more methods described in the present document. The memory (memories) 1504 may be used for storing data and code used for implementing the methods and techniques described herein. The video processing hardware 1506 may be used to implement, in hardware circuitry, some techniques described in the present document.

Figure 16:
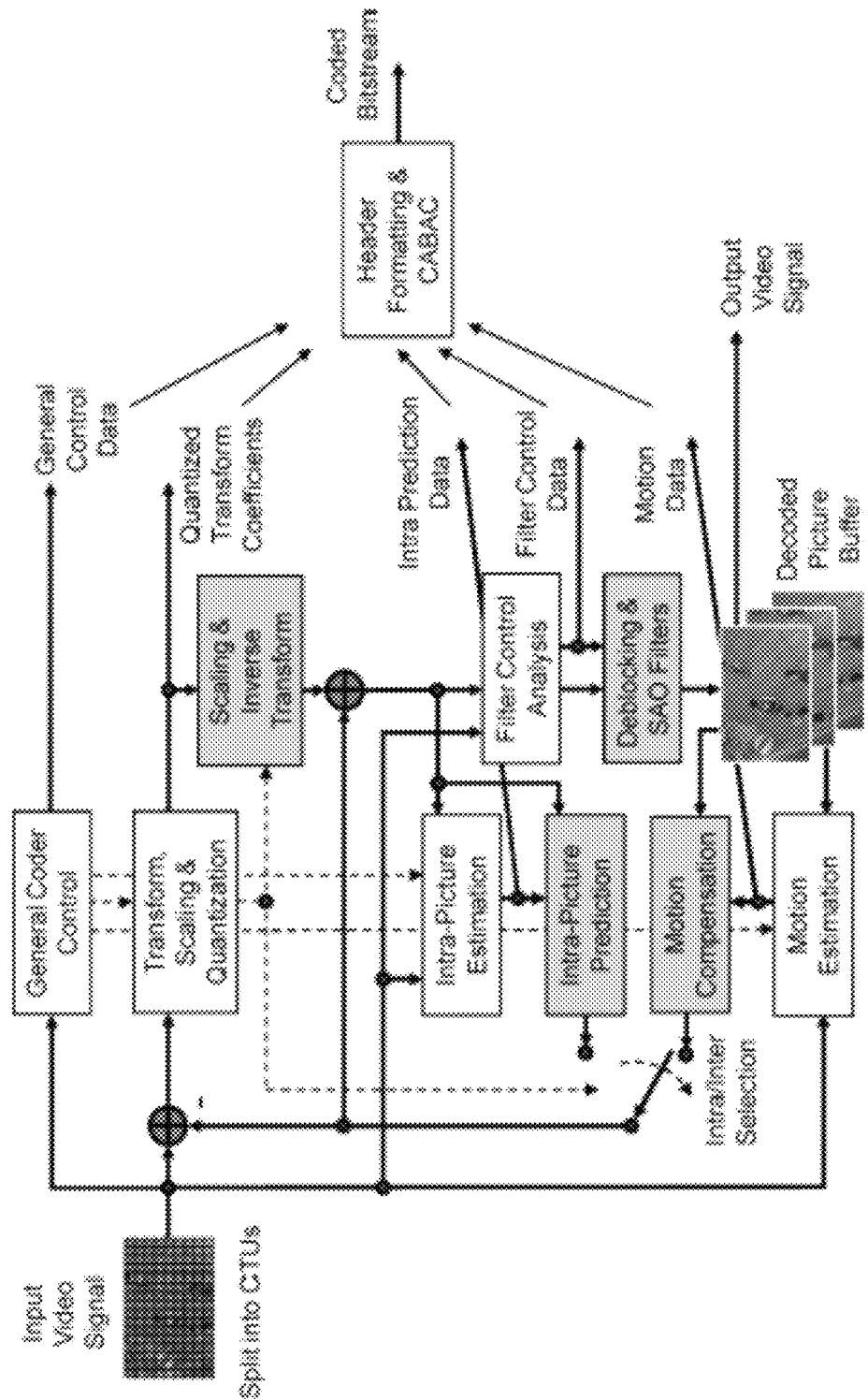
FIG. 16 shows a block diagram of an example implementation of a video encoder.

FIG. 16 is a block diagram of an example implementation of a video encoder. FIG. 16 shows that the encoder implementation has a feedback path built in in which the video encoder also performs video decoding functionality (reconstructing compressed representation of video data for use in encoding of next video data).

Figure 17:
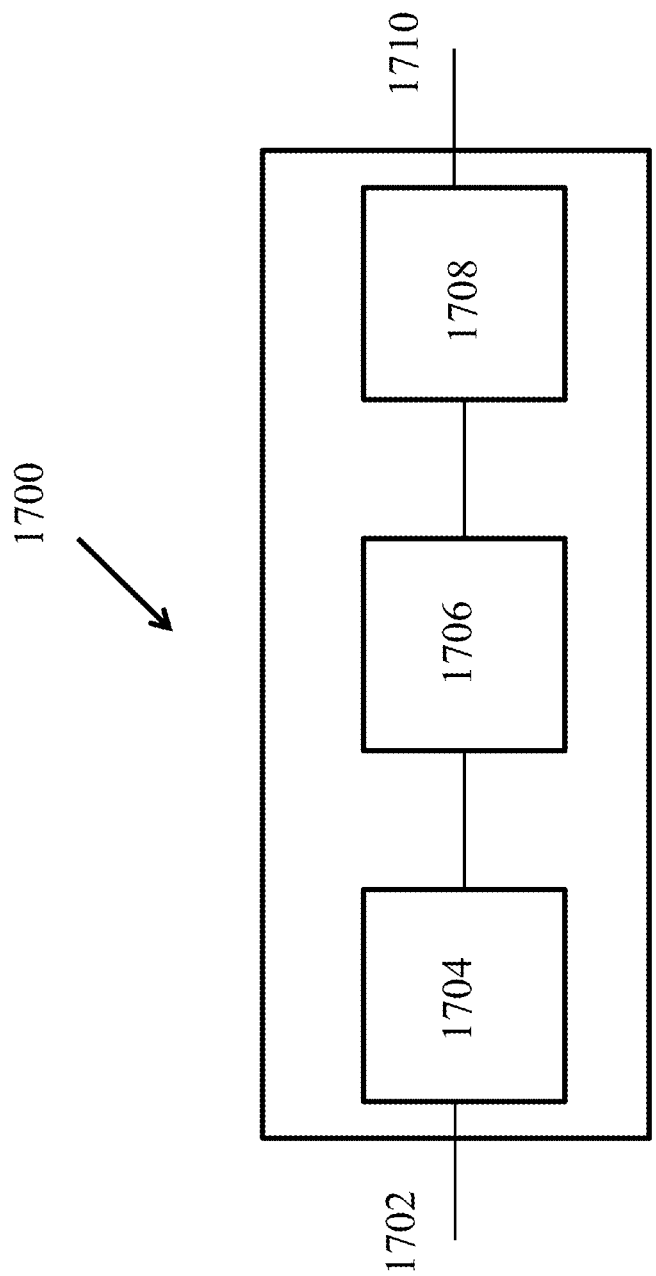
FIG. 17 is a block diagram of an example video processing system in which disclosed techniques may be implemented.

FIG. 17 is a block diagram showing an example video processing system 1700 in which various techniques disclosed herein may be implemented. Various implementations may include some or all of the components of the system 1700. The system 1700 may include input 1702 for receiving video content. The video content may be received in a raw or uncompressed format, e.g., 8 or 10 bit multi-component pixel values, or may be in a compressed or encoded format. The input 1702 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1700 may include a coding component 1704 that may implement the various coding or encoding methods described in the present document. The coding component 1704 may reduce the average bitrate of video from the input 1702 to the output of the coding component 1704 to produce a coded representation of the video. The coding techniques are therefore sometimes called video compression or video transcoding techniques. The output of the coding component 1704 may be either stored, or transmitted via a communication connected, as represented by the component 1706. The stored or communicated bitstream (or coded) representation of the video received at the input 1702 may be used by the component 1708 for generating pixel values or displayable video that is sent to a display interface 1710. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 18A:
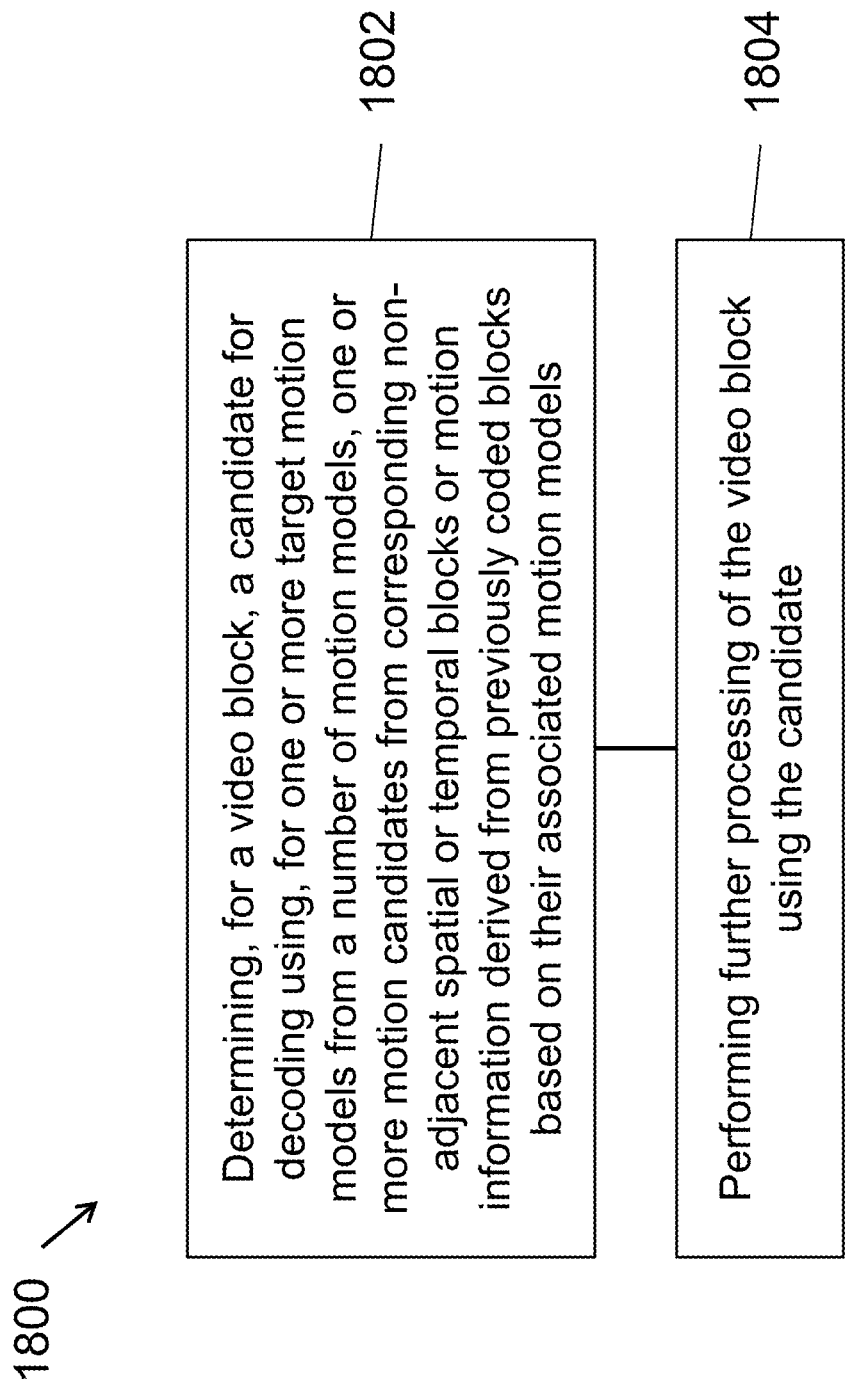
FIGS. 18A-18F are flowcharts for examples of video processing methods.

FIG. 18A is a flowchart for an example method 1800 for video processing. The method 1800 includes, at step 1802, determining, for a video block, a candidate for decoding using, for one or more target motion models from a number of motion models, one or more motion candidates from corresponding non-adjacent spatial or temporal blocks or motion information derived from previously coded blocks based on their associated motion models.

The method 1800 includes, at step 1804, performing further processing of the video block using the candidate.

Figure 18B:
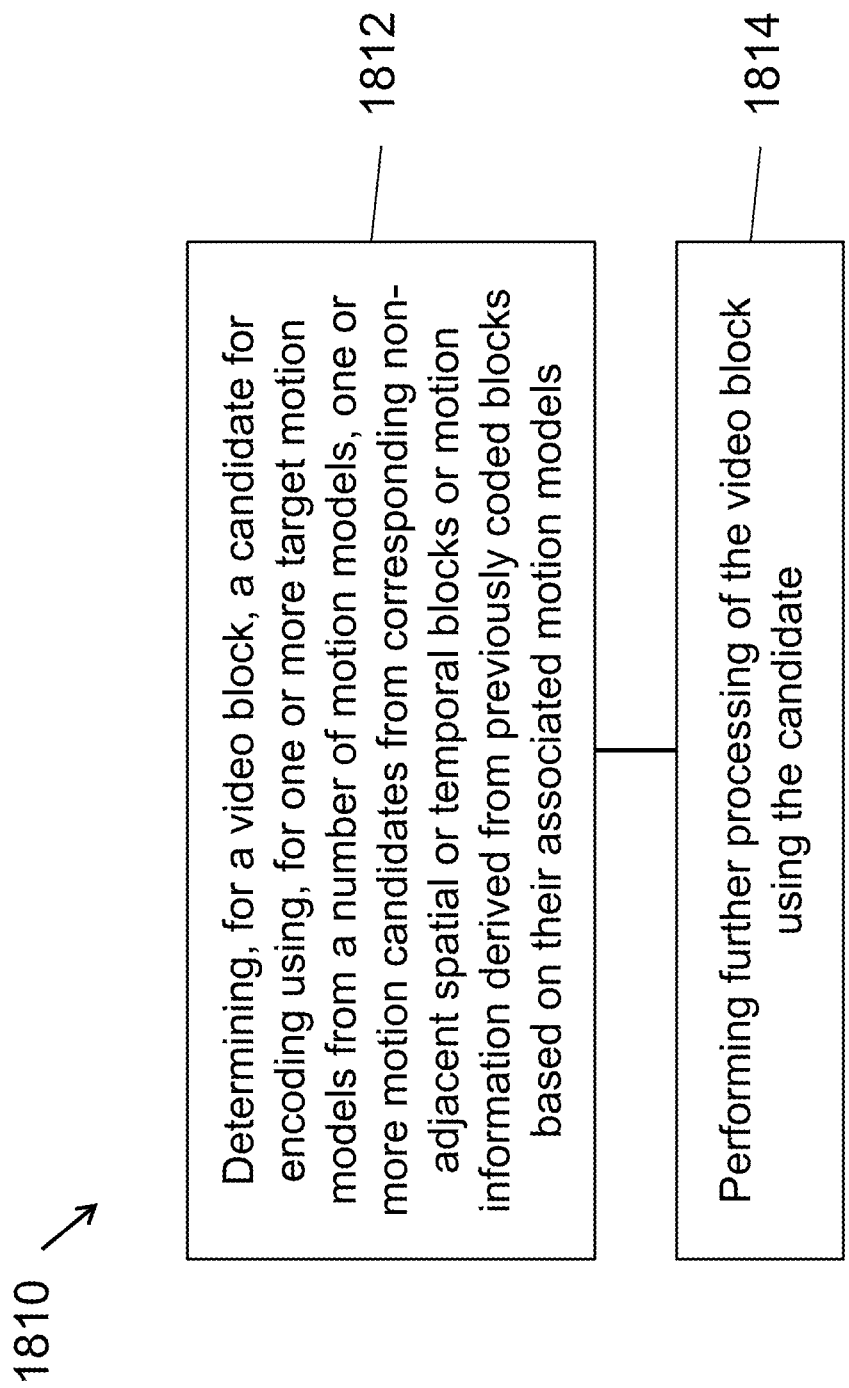

FIG. 18B is a flowchart for an example method 1810 for video processing. The method 1810 includes, at step 1812, determining, for a video block, a candidate for encoding using, for one or more target motion models from a number of motion models, one or more motion candidates from corresponding non-adjacent spatial or temporal blocks or motion information derived from previously coded blocks based on their associated motion models.

The method 1810 includes, at step 1814, performing further processing of the video block using the candidate.

Figure 18C:
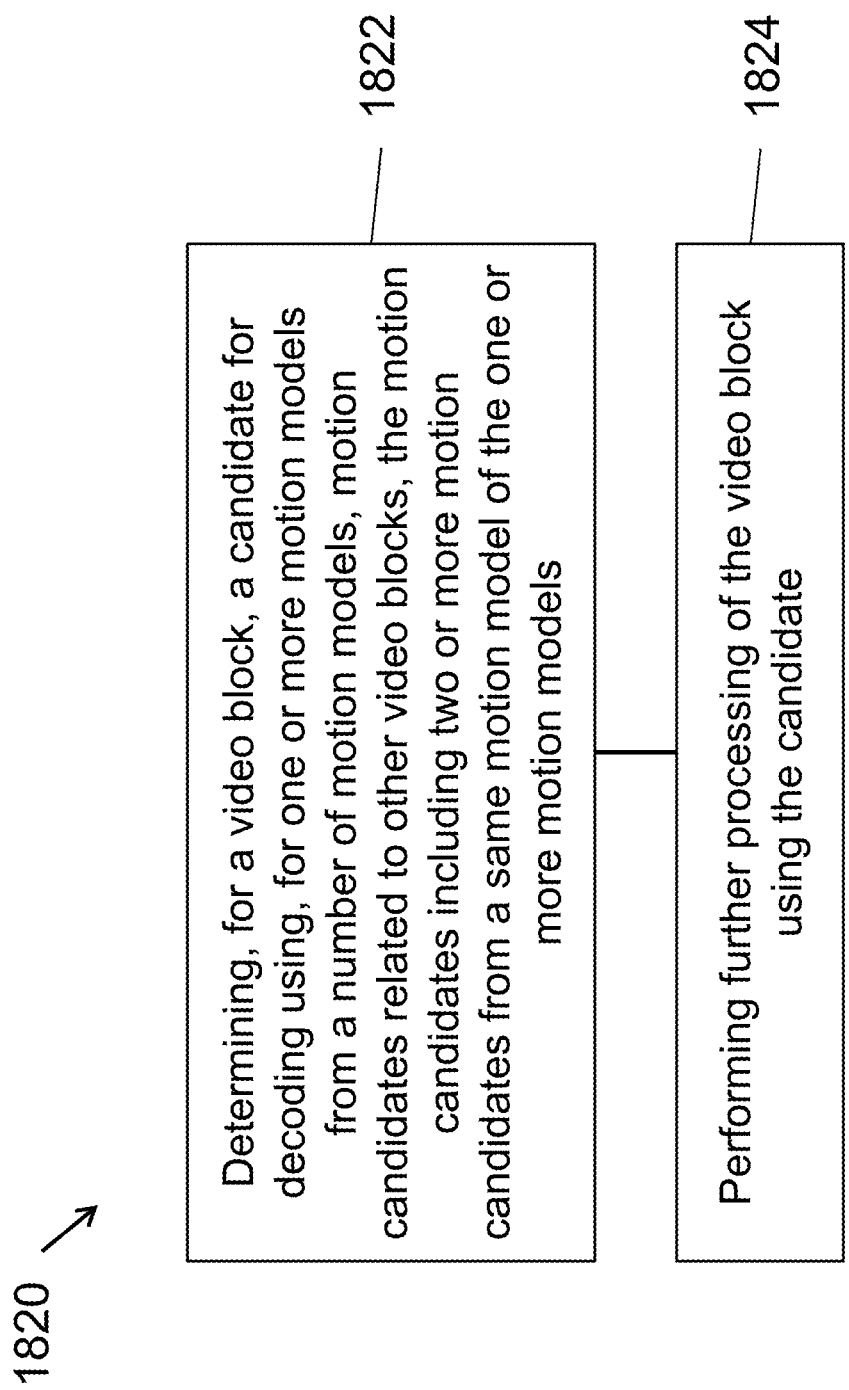

FIG. 18C is a flowchart for an example method 1820 for video processing. The method 1820 includes, at step 1822, determining, for a video block, a candidate for decoding using, for one or more motion models from a number of motion models, motion candidates related to other video blocks, the motion candidates including two or more motion candidates from a same motion model of the one or more motion models.

The method 1820 includes, at step 1824, performing further processing of the video block using the candidate.

Figure 18D:
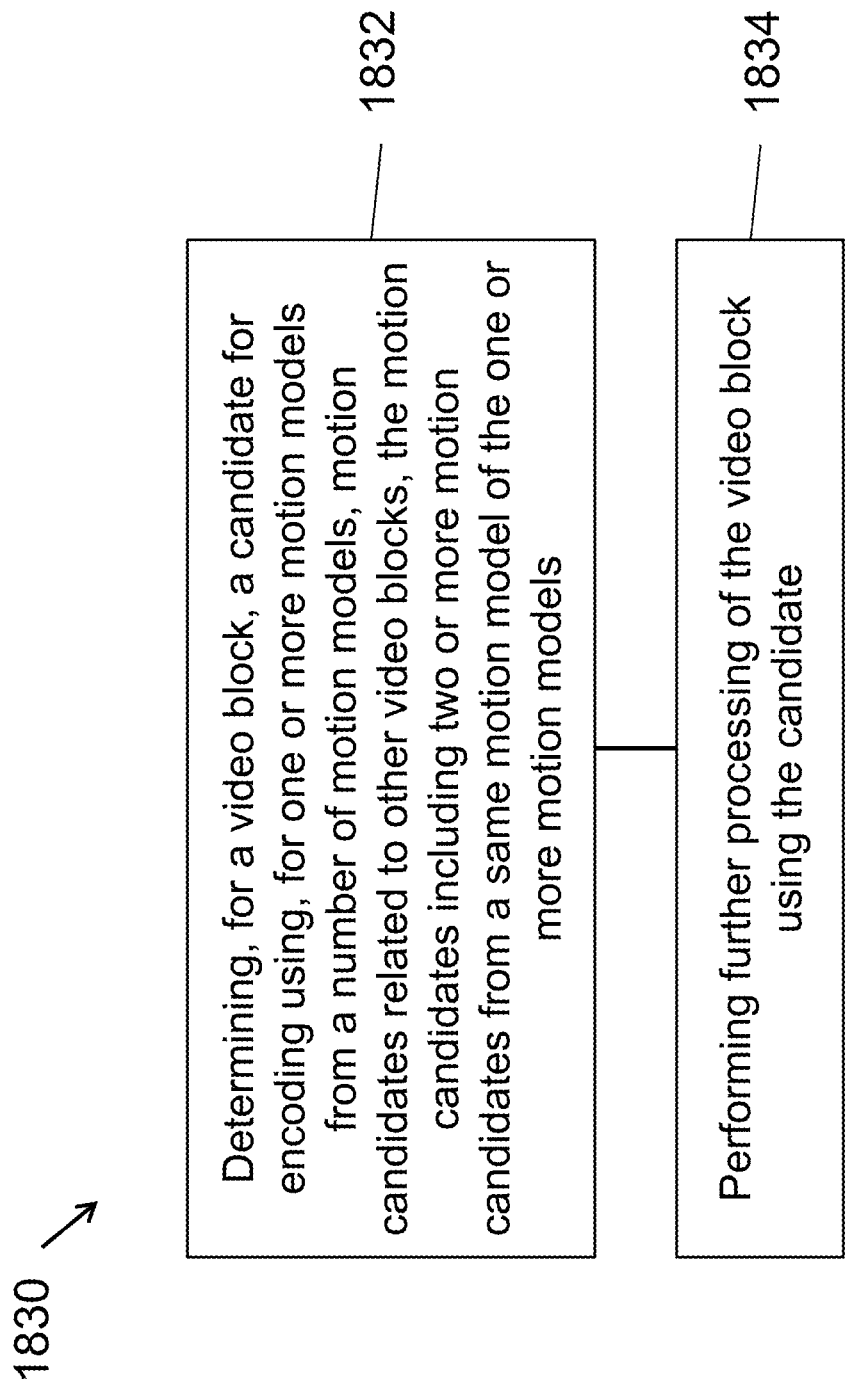

FIG. 18D is a flowchart for an example method 1830 for video processing. The method 1830 includes, at step 1832, determining, for a video block, a candidate for encoding using, for one or more motion models from a number of motion models, motion candidates related to other video blocks, the motion candidates including two or more motion candidates from a same motion model of the one or more motion models.

The method 1830 includes, at step 1834, performing further processing of the video block using the candidate.

Figure 18E:
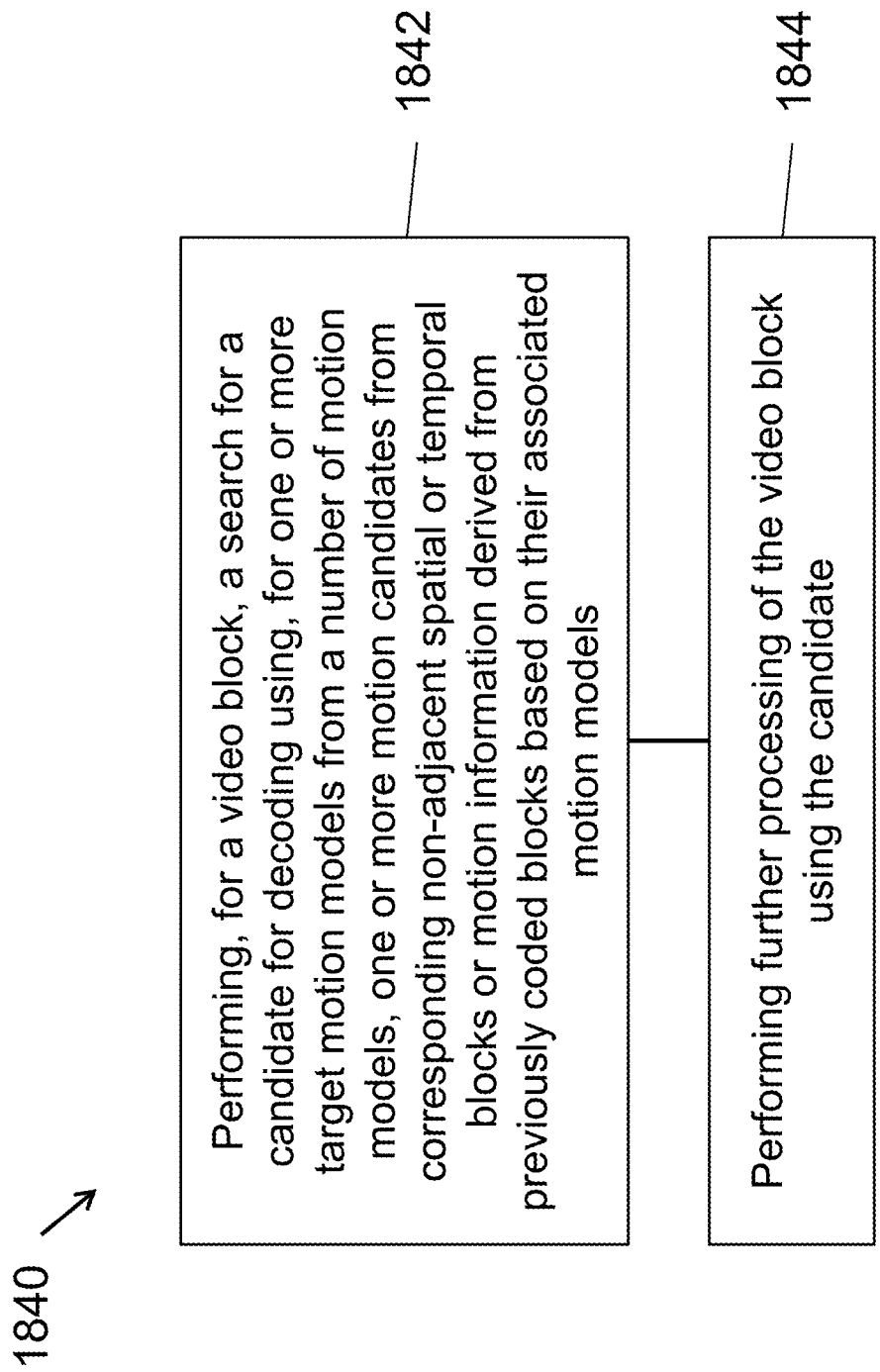

FIG. 18E is a flowchart for an example method 1840 for video processing. The method 1840 includes, at step 1842, performing, for a video block, a search for a candidate for decoding using, for one or more target motion models from a number of motion models, one or more motion candidates from corresponding non-adjacent spatial or temporal blocks or motion information derived from previously coded blocks based on their associated motion models.

The method 1840 includes, at step 1844, performing further processing of the video block using the candidate. In some embodiments, a searching order for the search is based on at least one motion model of the one or more target motion models.

Figure 18F:
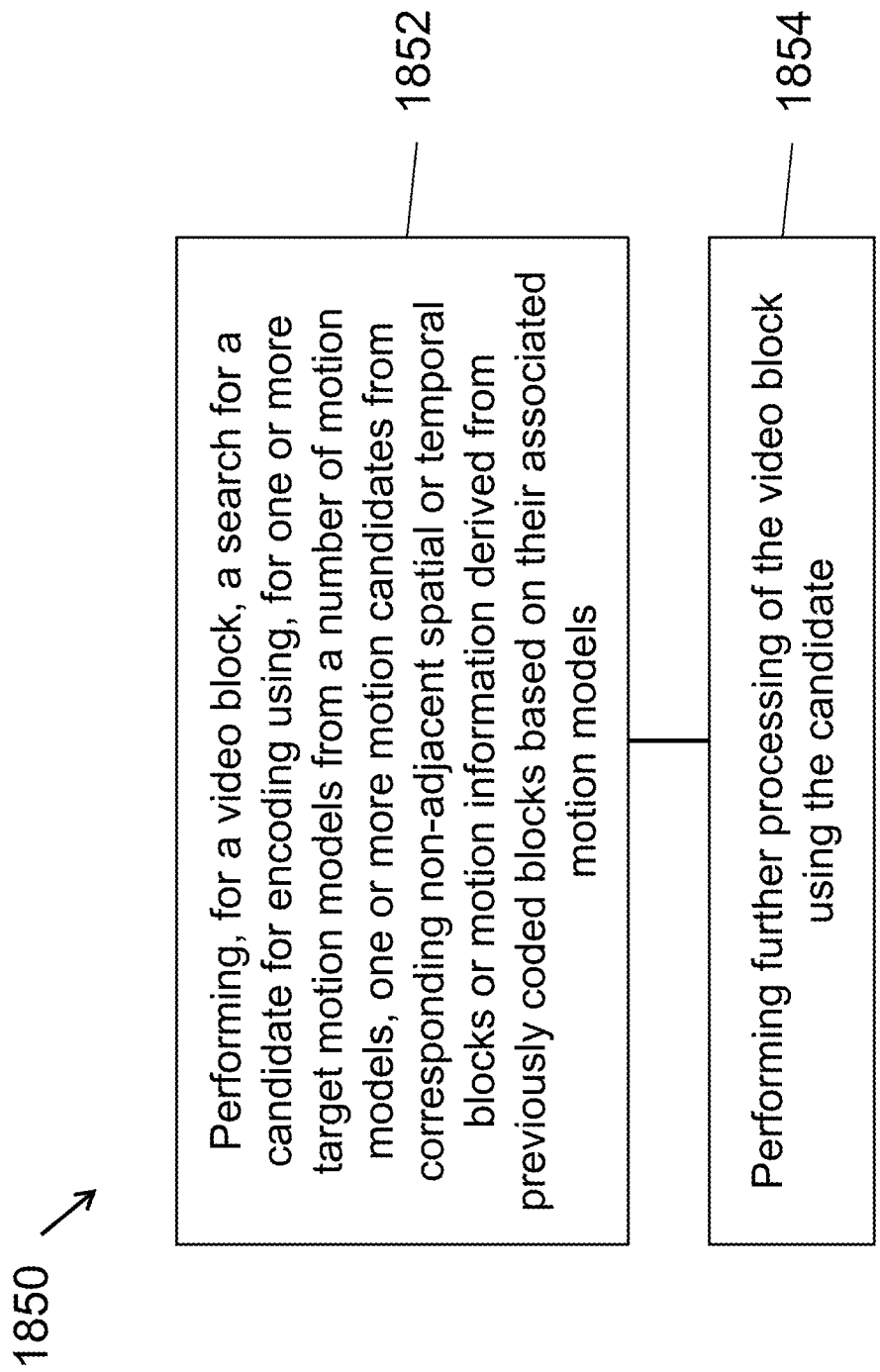

FIG. 18F is a flowchart for an example method 1850 for video processing. The method 1850 includes, at step 1852, performing, for a video block, a search for a candidate for encoding using, for one or more target motion models from a number of motion models, one or more motion candidates from corresponding non-adjacent spatial or temporal blocks or motion information derived from previously coded blocks based on their associated motion models.

The method 1850 includes, at step 1854, performing further processing of the video block using the candidate. In some embodiments, a searching order for the search is based on at least one motion model of the one or more target motion models.

Improvements achieved by incorporating embodiments of the disclosed technology into HEVC reference software are shown in the experimental results below.

The tables below show the Bjøntegaard delta bitrate (or BD-rate) gain and processing time impact of the proposed approach. Different sets of simulations (with different encoder complexity) are conducted for the RA and LDP configurations, following the common test conditions on top of reference software TAVS3-1.0. For example, "RA" represents random access corresponding to a set of coding conditions designed to enable relatively-frequent random access points in the coded video data, with less emphasis on minimization of delay. In contrast, "LDP" represents low-delay conditions using P frames designed to enable interactive real-time communication, with less emphasis on ease of random access. In all the tests, the table size S is set to 8 and constraint FIFO rule (to remove and add entries to the candidate table) is applied.

TABLE 1

Performance of HMVP under RA with $N_{rdo} = 3$

| Seq | BDR-Y | BDR-U | BDR-V | Enc | Dec |
|---|---|---|---|---|---|
| 720p | −1.67% | −0.44% | −0.77% | 97.80% | 103.32% |
| 1080p | −1.16% | −0.89% | −1.01% | 97.84% | 104.17% |
| 4K | −2.81% | −1.13% | −0.66% | 96.32% | 100.87% |
| All | −1.88% | −0.82% | −0.81% | 97.32% | 102.78% |

TABLE 2

Performance of HMVP under RA with $N_{rdo} = 4$

| Seq | BDR-Y | BDR-U | BDR-V | Enc | Dec |
|---|---|---|---|---|---|
| 720p | −1.86% | −0.41% | −0.85% | 104.06% | 100.67% |
| 1080p | −1.44% | −1.28% | −1.22% | 102.40% | 103.63% |
| 4K | −3.13% | −1.45% | −1.02% | 101.44% | 100.70% |
| All | −2.14% | −1.04% | −1.03% | 102.63% | 101.67% |

TABLE 3

Performance of HMVP under RA with $N_{rdo} = 5$

| Seq | BDR-Y | BDR-U | BDR-V | Enc | Dec |
|---|---|---|---|---|---|
| 720p | −1.86% | −0.62% | −0.75% | 109.19% | 102.19% |
| 1080p | −1.78% | −1.57% | −1.34% | 107.96% | 104.60% |
| 4K | −2.27% | −1.20% | −0.86% | 106.36% | 101.60% |
| All | −1.97% | −1.13% | −0.99% | 107.83% | 102.80% |

TABLE 4

Performance of HMVP under LDP with $N_{rdo} = 2$

| Seq | BDR-Y | BDR-U | BDR-V | Enc | Dec |
|---|---|---|---|---|---|
| 720p | −1.83% | −0.64% | −0.86% | 97.01% | 103.70% |
| 1080p | −2.21% | −1.77% | −1.72% | 98.57% | 103.77% |
| 4K | −2.14% | −2.34% | −2.08% | 95.50% | 103.63% |
| All | −2.06% | −1.58% | −1.55% | 97.03% | 103.70% |

TABLE 5

Performance of HMVP under LDP with $N_{rdo} = 3$

| Seq | BDR-Y | BDR-U | BDR-V | Enc | Dec |
|---|---|---|---|---|---|
| 720p | −2.40% | −0.74% | −0.63% | 101.87% | 104.28% |
| 1080p | −2.85% | −2.34% | −2.33% | 103.21% | 105.12% |
| 4K | −2.17% | −2.83% | −2.52% | 100.42% | 105.40% |
| All | −2.48% | −1.97% | −1.83% | 101.83% | 104.93% |

When there are up to 8 HMVP candidates, compared with TAVS3-1.0 reference software model, the above simulation results show that some embodiments described in this document achieve 1.88%, 2.14%, 1.94% BD rate reduction for random access (RA) with 3, 4 or 5 full rate-distortion optimization (RDO) processes respectively. For the LDP case, the proposed HMVP achieves 2.06% and 2.48% BD rate reduction with 2 or 3 full RDO processes, respectively. Minor encoding and decoding time impact is noticed and for some cases, encoder running time could be even reduced compared to TAVS2-1.0.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for video processing, comprising:
   determining, for a conversion between a current block in a video coded with a multiple motion model-based skip or direct mode and a bitstream of the video including a candidate index for the current block, a first motion candidate from one or more motion candidates in a history motion vector prediction (HMVP) table; and
   performing the conversion based on the first motion candidate,
   wherein each motion model of multiple motion models corresponds to one or multiple motion candidates derived from a same rule and the candidate index is associated with a motion model of the multiple motion models used for the current block,
   wherein the multiple motion models include at least one first motion model that derives a second motion candidate from the HMVP table, wherein the method further comprises:
   maintaining the HMVP table which includes the one or more motion candidates, wherein the one or more motion candidates in the HMVP table are derived from one or more previous blocks of the current block, and wherein positions of the one or more motion candidates in the HMVP table are arranged based on an encoding/decoding order respective to the one or more previous blocks;
   determining whether to update the HMVP table using motion information derived during the conversion; and
   updating the HMVP table based on the encoding/decoding order respective to the one or more previous blocks if it is determined to update the HMVP table,
   wherein the multiple motion models further include at least one second motion model that comprises at least one of (a) a motion model that derives a third motion candidate from a picture other than the current picture or (b) a motion model that derives a fourth motion candidate from spatial adjacent blocks of a block, and
   wherein the at least one first motion model is arranged after the at least one second motion model, wherein the method further comprises applying a pruning operation between the first motion candidate from one or more motion candidates in the HMVP table and a motion candidate derived using the at least one second motion model.

2. The method of claim 1, wherein the second motion model corresponds to at least one of a temporal mode, a bi-direction mode, a symmetry mode, a backward mode, or a forward mode.

3. The method of claim 1, wherein the second motion model derives the fourth motion candidate in a motion model-matched search, an artificial search, or a default motion vector construction process.

4. The method of claim 1, wherein the candidate index is coded using a truncated binarization method.

5. The method of claim 1, wherein each bin of the candidate index is coded with one or more contexts.

6. The method of claim 1, wherein information associated with a number of the at least one first motion model for the HMVP table is signaled in a sequence header.

7. The method of claim 1, wherein each of the one or more motion candidates in the HMVP table corresponds to a first motion model of the at least one first motion model.

8. The method of claim 1, wherein a checking order for searching the one or more motion candidates from the HMVP table is pre-defined.

9. The method of claim 1, wherein a checking order corresponding to the first motion model and for searching the one or more motion candidates from the HMVP table is different from a checking order corresponding to the second motion model.

10. The method of claim 1, wherein performing the conversion comprises generating the bitstream from the current block.

11. The method of claim 1, wherein performing the conversion comprises generating the current block from the bitstream.

12. An apparatus for processing video data comprising a processor and a non-transitory memory with instructions thereon, wherein the instructions upon execution by the processor, cause the processor to:
determine, for a conversion between a current block in a video coded with a multiple motion model-based skip or direct mode and a bitstream of the video including a candidate index for the current block, a first motion candidate from one or more motion candidates in a history motion vector prediction (HMVP) table; and
perform the conversion based on the first motion candidate,
wherein each motion model of multiple motion models corresponds to one or multiple motion candidates derived from a same rule and the candidate index is associated with a motion model of the multiple motion models used for the current block,
wherein the multiple motion models include at least one first motion model that derives a second motion candidate from the HMVP table, wherein the instructions further cause the processor to:
maintain the HMVP table which includes the one or more motion candidates, wherein the one or more motion candidates in the HMVP table are derived from one or more previous blocks of the current block, and wherein positions of the one or more motion candidates in the HMVP table are arranged based on
an encoding/decoding order respective to the one or more previous blocks;
determine whether to update the HMVP table using motion information derived during the conversion; and
update the HMVP table based on the encoding/decoding order respective to the one or more previous blocks if it is determined to update the HMVP table,
wherein the multiple motion models further include at least one second motion model that comprises at least one of (a) a motion model that derives a third motion candidate from a picture other than the current picture or (b) a motion model that derives a fourth motion candidate from spatial adjacent blocks of a block, and
wherein the at least one first motion model is arranged after the at least one second motion model, wherein the instructions further cause the processor to apply a pruning operation between the first motion candidate from one or more motion candidates in the HMVP table and a motion candidate derived using the at least one second motion model.

13. The apparatus of claim 12, wherein the second motion model corresponds to at least one of a temporal mode, a bi-direction mode, a symmetry mode, a backward mode, or a forward mode.

14. The apparatus of claim 12, wherein the second motion model derives the fourth motion candidate in a motion model-matched search, an artificial search, or a default motion vector construction process.

15. A non-transitory computer-readable storage medium storing instructions that cause a processor to:
determine, for a conversion between a current block in a video coded with a multiple motion model-based skip or direct mode and a bitstream of the video including a candidate index for the current block, a first motion candidate from one or more motion candidates in a history motion vector prediction (HMVP) table; and
perform the conversion based on the first motion candidate,
wherein each motion model of multiple motion models corresponds to one or multiple motion candidates derived from a same rule and the candidate index is associated with a motion model of the multiple motion models used for the current block,
wherein the multiple motion models include at least one first motion model that derives a second motion candidate from the HMVP table, wherein the instructions further cause the processor to:
maintain the HMVP table which includes the one or more motion candidates, wherein the one or more motion candidates in the HMVP table are derived from one or more previous blocks of the current block, and wherein positions of the one or more motion candidates in the HMVP table are arranged based on
an encoding/decoding order respective to the one or more previous blocks;
determine whether to update the HMVP table using motion information derived during the conversion; and
update the HMVP table based on the encoding/decoding order respective to the one or more previous blocks if it is determined to update the HMVP table,
wherein the multiple motion models further include at least one second motion model that comprises at least one of (a) a motion model that derives a third motion candidate from a picture other than the current picture or (b) a motion model that derives a fourth motion candidate from spatial adjacent blocks of a block, and
wherein the at least one first motion model is arranged after the at least one second motion model, wherein the instructions further cause the processor to apply a pruning operation between the first motion candidate from one or more motion candidates in the HMVP table and a motion candidate derived using the at least one second motion model.

16. The non-transitory computer-readable storage medium of claim 15, wherein the second motion model corresponds to at least one of a temporal mode, a bi-direction mode, a symmetry mode, a backward mode, or a forward mode.

17. The non-transitory computer-readable storage medium of claim 15, wherein the second motion model derives the fourth motion candidate in a motion model-matched search, an artificial search, or a default motion vector construction process.

18. A non-transitory computer-readable recording medium storing a bitstream which is generated by a method performed by a video processing apparatus, wherein the method comprises:
- determining, for a conversion between a current block in a video coded with a multiple motion model-based skip or direct mode and a bitstream of the video including a candidate index for the current block, a first motion candidate from one or more motion candidates in a history motion vector prediction (HMVP) table; and
- performing the conversion based on the first motion candidate,
- wherein each motion model of multiple motion models corresponds to one or multiple motion candidates derived from a same rule and the candidate index is associated with a motion model of the multiple motion models used for the current block,
- wherein the multiple motion models include at least one first motion model that derives a second motion candidate from the HMVP table, wherein the method further comprises:
- maintaining the HMVP table which includes the one or more motion candidates, wherein the one or more motion candidates in the HMVP table are derived from one or more previous blocks of the current block, and wherein positions of the one or more motion candidates in the HMVP table are arranged based on
- an encoding/decoding order respective to the one or more previous blocks;
- determining whether to update the HMVP table using motion information derived during the conversion; and
- updating the HMVP table based on the encoding/decoding order respective to the one or more previous blocks if it is determined to update the HMVP table,
- wherein the multiple motion models further include at least one second motion model that comprises at least one of (a) a motion model that derives a third motion candidate from a picture other than the current picture or (b) a motion model that derives a fourth motion candidate from spatial adjacent blocks of a block, and
- wherein the at least one first motion model is arranged after the at least one second motion model, wherein the method further comprises applying a pruning operation between the first motion candidate from one or more motion candidates in the HMVP table and a motion candidate derived using the at least one second motion model.

19. The non-transitory computer-readable recording medium of claim 18, wherein the second motion model corresponds to at least one of a temporal mode, a bi-direction mode, a symmetry mode, a backward mode, or a forward mode.

20. The non-transitory computer-readable recording medium of claim 18, wherein the second motion model derives the fourth motion candidate in a motion model-matched search, an artificial search, or a default motion vector construction process.

* * * * *